(12) United States Patent
Cox et al.

(10) Patent No.: US 7,210,654 B1
(45) Date of Patent: May 1, 2007

(54) UNMANNED AIRBORNE RECONNAISSANCE SYSTEM

(75) Inventors: Beverly Cox, San Antonio, TX (US); Hampton Dews, Medina, TX (US); Nicholas Nyroth, San Antonio, TX (US)

(73) Assignee: Mission Technologies, Inc., San Antonio, TX (US)

( * ) Notice: Subject to any disclaimer, the term of this patent is extended or adjusted under 35 U.S.C. 154(b) by 0 days.

(21) Appl. No.: 10/625,399

(22) Filed: Jul. 23, 2003

(51) Int. Cl.
*B64F 1/06* (2006.01)

(52) U.S. Cl. ..................................... 244/63; 244/190

(58) Field of Classification Search ............. 244/45 R, 244/45 A, 63, 190, 3.1
See application file for complete search history.

(56) References Cited

U.S. PATENT DOCUMENTS

| | | | |
|---|---|---|---|
| 922,710 A | 5/1909 | Meand | |
| 1,353,663 A | 9/1920 | Napier | |
| 1,388,361 A | 8/1921 | Mesurier | |
| 1,749,357 A | 3/1930 | Schmelz | |
| 1,749,769 A | 3/1930 | Johnson | |
| 1,960,264 A | 5/1934 | Heinkl | |
| 2,843,342 A * | 7/1958 | Ward | 244/63 |
| 2,856,139 A | 10/1958 | Lockwood | |
| 2,860,620 A | 11/1958 | Effinger, Jr. | |
| 2,921,574 A | 1/1960 | Saito | |
| 3,068,612 A | 12/1962 | Simpson | |
| 3,138,352 A | 6/1964 | Saholt | |
| 3,392,937 A | 7/1968 | Riblett, Jr. | |
| 3,534,929 A | 10/1970 | Johansen et al. | |
| 3,703,998 A | 11/1972 | Girard | |
| 3,778,007 A | 12/1973 | Kearney et al. | |
| 3,905,350 A | 9/1975 | Becker | |
| 3,968,947 A | 7/1976 | Schlegel et al. | |
| 3,985,317 A | 10/1976 | Geraci et al. | |
| 4,014,246 A | 3/1977 | Nissley, Jr. | |
| 4,053,125 A | 10/1977 | Ratony | |
| 4,060,930 A | 12/1977 | Hirtle et al. | |
| 4,079,901 A | 3/1978 | Mayhew et al. | |
| 4,238,093 A * | 12/1980 | Siegel et al. | 244/63 |
| 4,279,195 A | 7/1981 | Miller | |
| 4,333,382 A | 6/1982 | Holt et al. | |
| 4,471,923 A * | 9/1984 | Hoppner et al. | 244/63 |
| 4,530,476 A * | 7/1985 | Thurber et al. | 244/3.21 |
| 4,591,114 A | 5/1986 | Block | |
| 4,666,105 A * | 5/1987 | Dellinger et al. | 244/63 |
| 4,678,143 A | 7/1987 | Griffin | |
| 4,856,736 A | 8/1989 | Adkins et al. | |

(Continued)

*Primary Examiner*—Galen Barefoot
(74) *Attorney, Agent, or Firm*—Jackson Walker, LLP

(57) ABSTRACT

An unmanned airborne reconnaissance system, the unmanned airborne reconnaissance system including a lightweight, portable, powered aircraft and a foldable launch rail, the aircraft, in a broken down condition and the launch rail in a broken down condition fitable inside a box, the box capable of being carried by one man. The launch system includes an elongated launch rail with the carriage assembly, and a propulsion means for accelerating the carriage assembly from one end of the launch rail to the other. The carriage assembly releasably engages the aircraft so as to propel the aircraft from one end of the launch rail to the other. The propulsion may be by a cartridge that explodes and releases a gas through a cylinder, or by elastic cords. The aircraft is guided through the air either by a programmed onboard computer which controls the control surfaces of the aircraft and/or by remote control. The aircraft typically contains a camera for recording and transmitting images received from the ground below.

2 Claims, 39 Drawing Sheets

U.S. PATENT DOCUMENTS

| | | |
|---|---|---|
| 4,909,458 A | 3/1990 | Martin |
| 5,035,382 A * | 7/1991 | Lissaman et al. ........... 244/190 |
| 5,046,684 A | 9/1991 | Wolkovitch |
| 5,118,052 A * | 6/1992 | Alvarez Calderon F ...... 244/49 |
| 5,303,695 A | 4/1994 | Shosowitz |
| 5,575,438 A | 11/1996 | McGonigle et al. |
| 5,615,846 A | 4/1997 | Shmolda et al. |
| 5,671,722 A | 9/1997 | Moody |
| 5,695,153 A | 12/1997 | Britton et al. |
| 5,779,190 A | 7/1998 | Rambo et al. |
| 5,899,410 A | 5/1999 | Garrett |
| 6,056,237 A * | 5/2000 | Woodland .................. 244/3.15 |
| 6,098,923 A | 8/2000 | Peters, Jr. |
| 6,119,976 A * | 9/2000 | Rogers ........................ 244/13 |
| 6,144,899 A | 11/2000 | Babb et al. |
| 6,186,211 B1 | 2/2001 | Knowles |
| 6,576,880 B2 | 6/2003 | Mortorana et al. |
| 6,626,399 B2 * | 9/2003 | Young et al. ................. 244/63 |
| 2003/0192985 A1 * | 10/2003 | Lipeles ........................ 244/13 |

\* cited by examiner

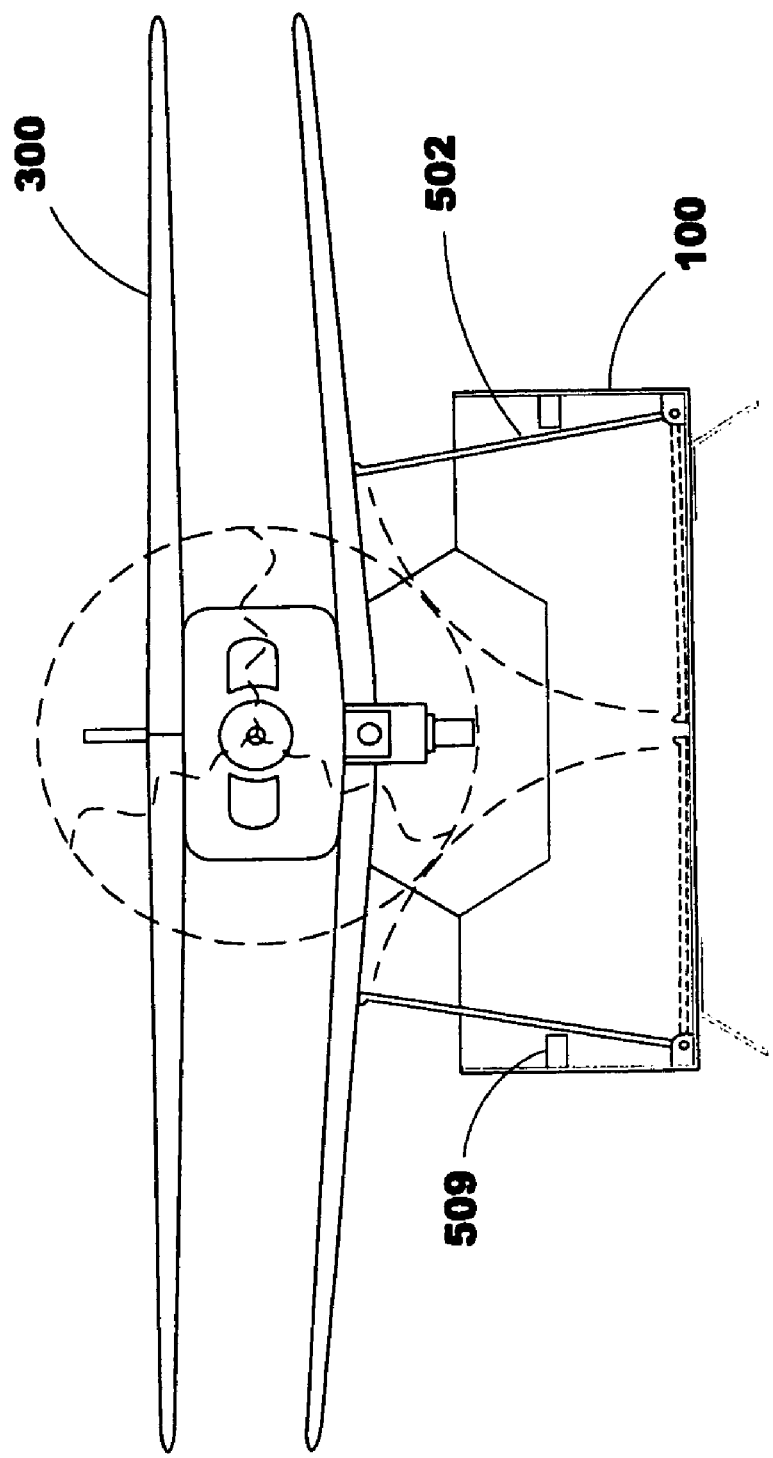

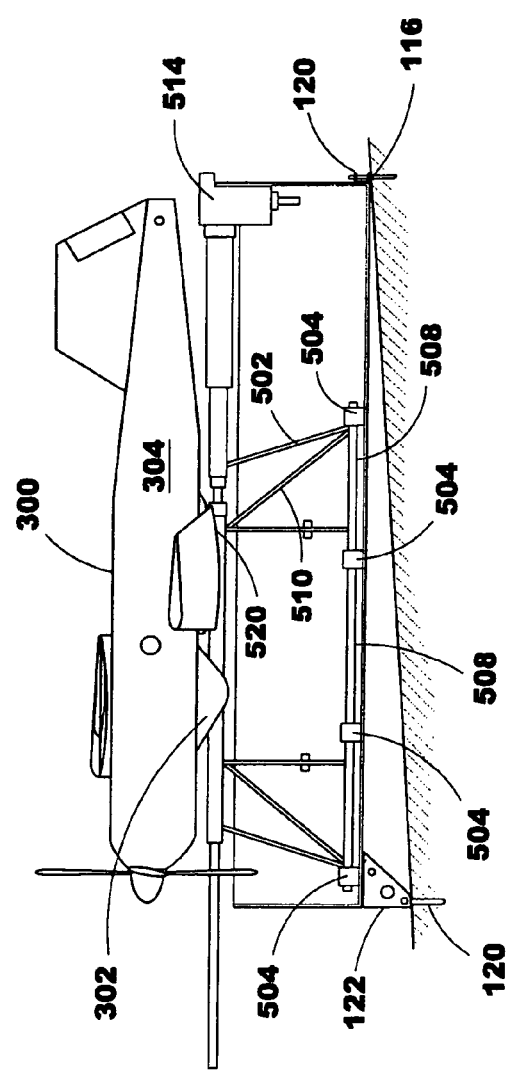
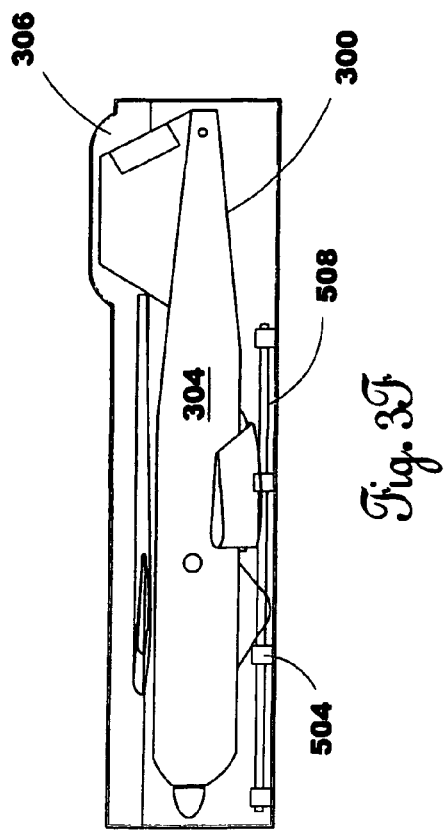
Fig. 3E
Fig. 3F

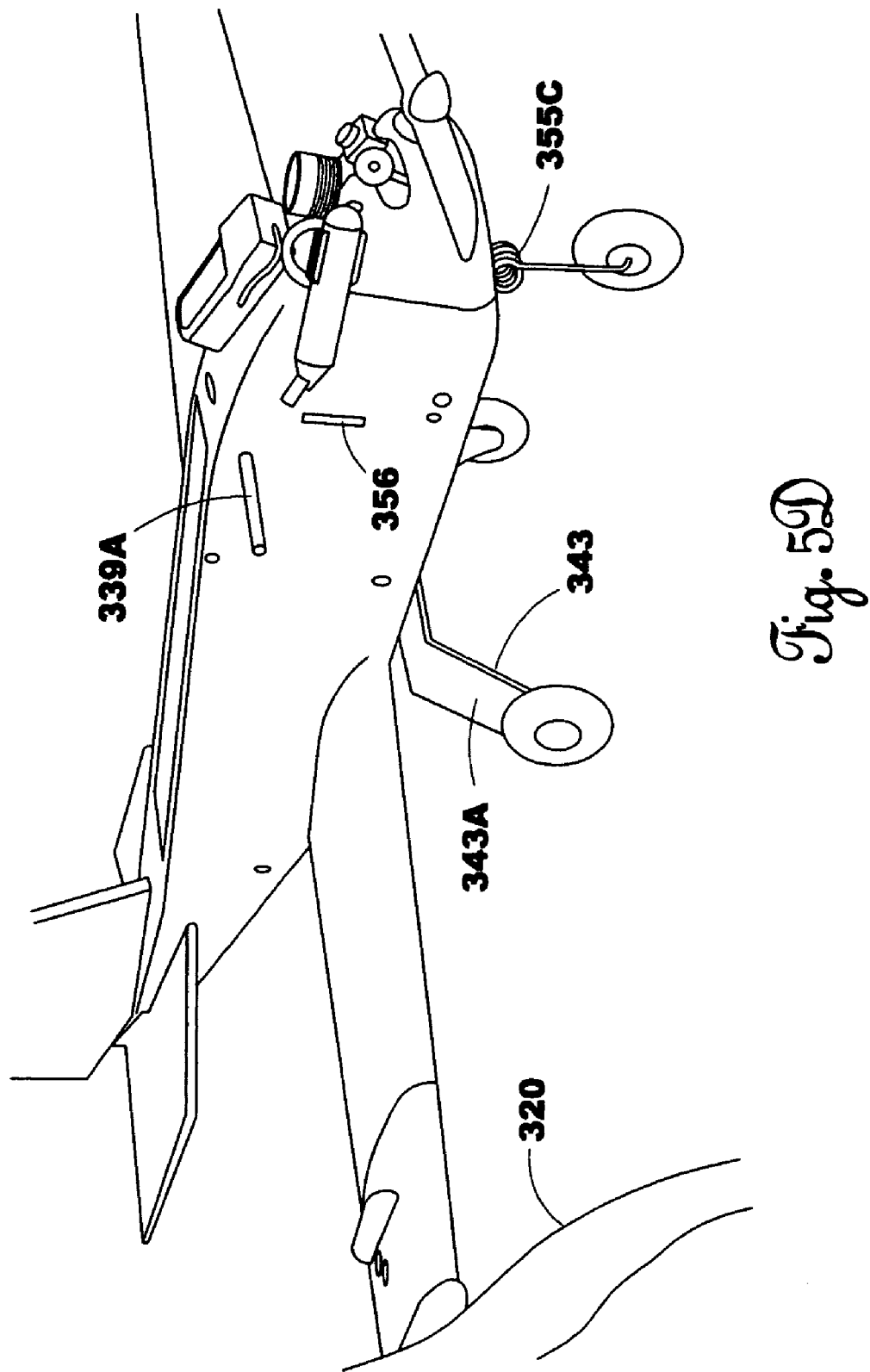

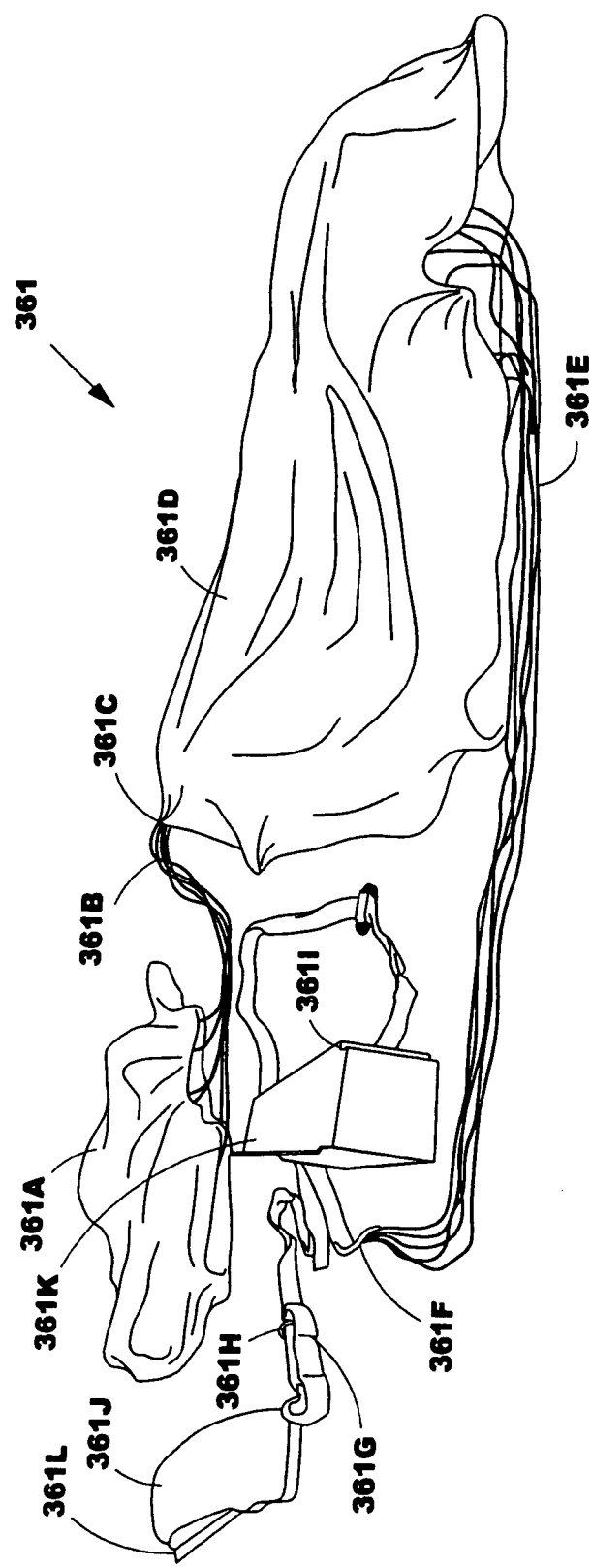

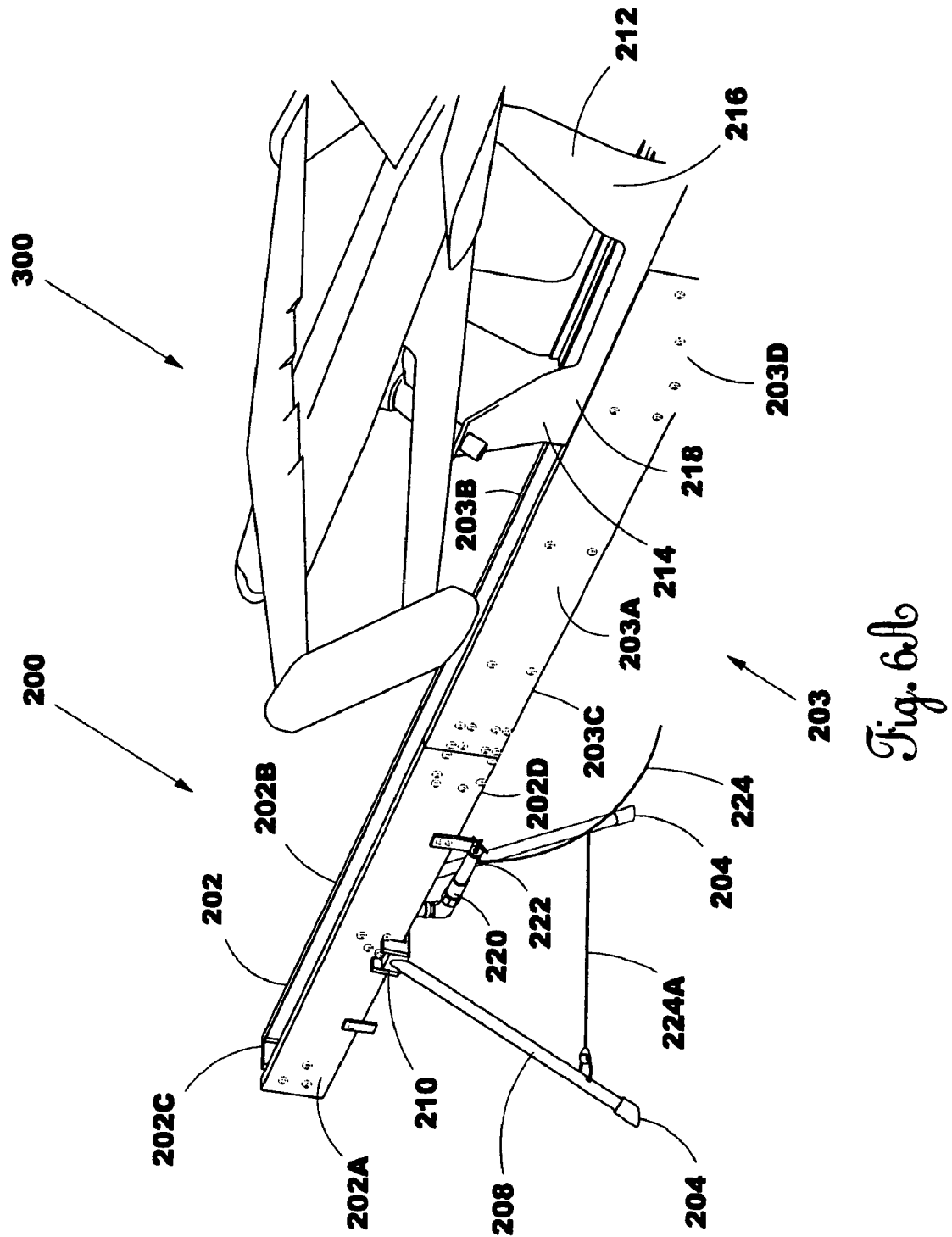

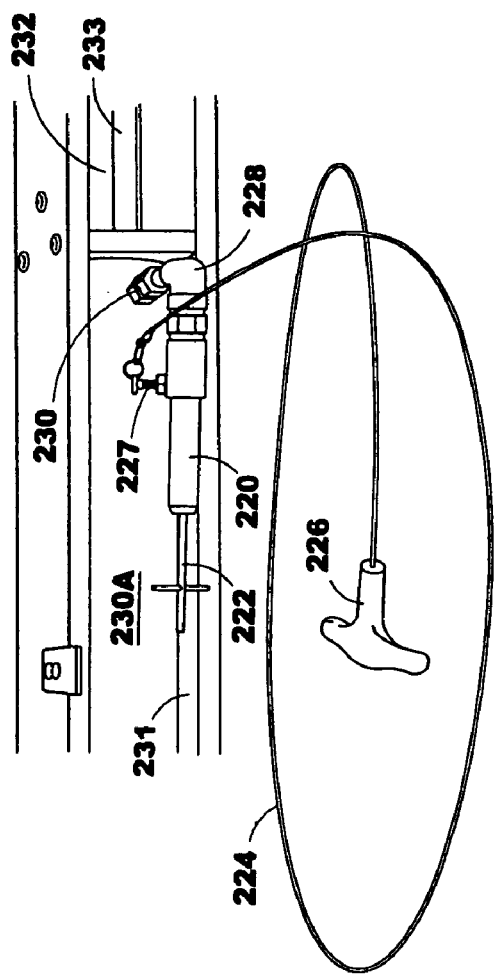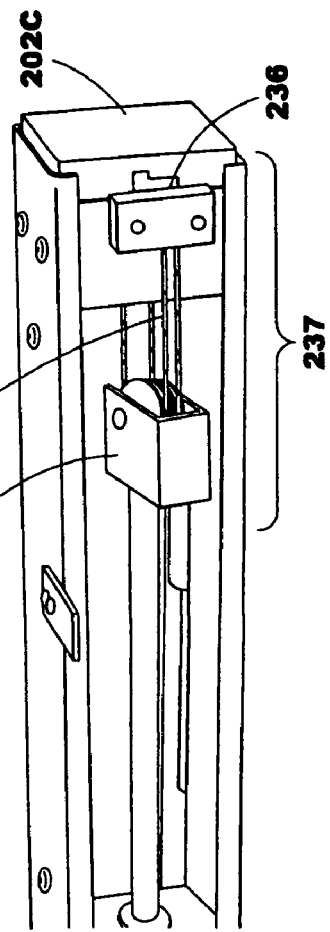
Fig. 6E
Fig. 6F

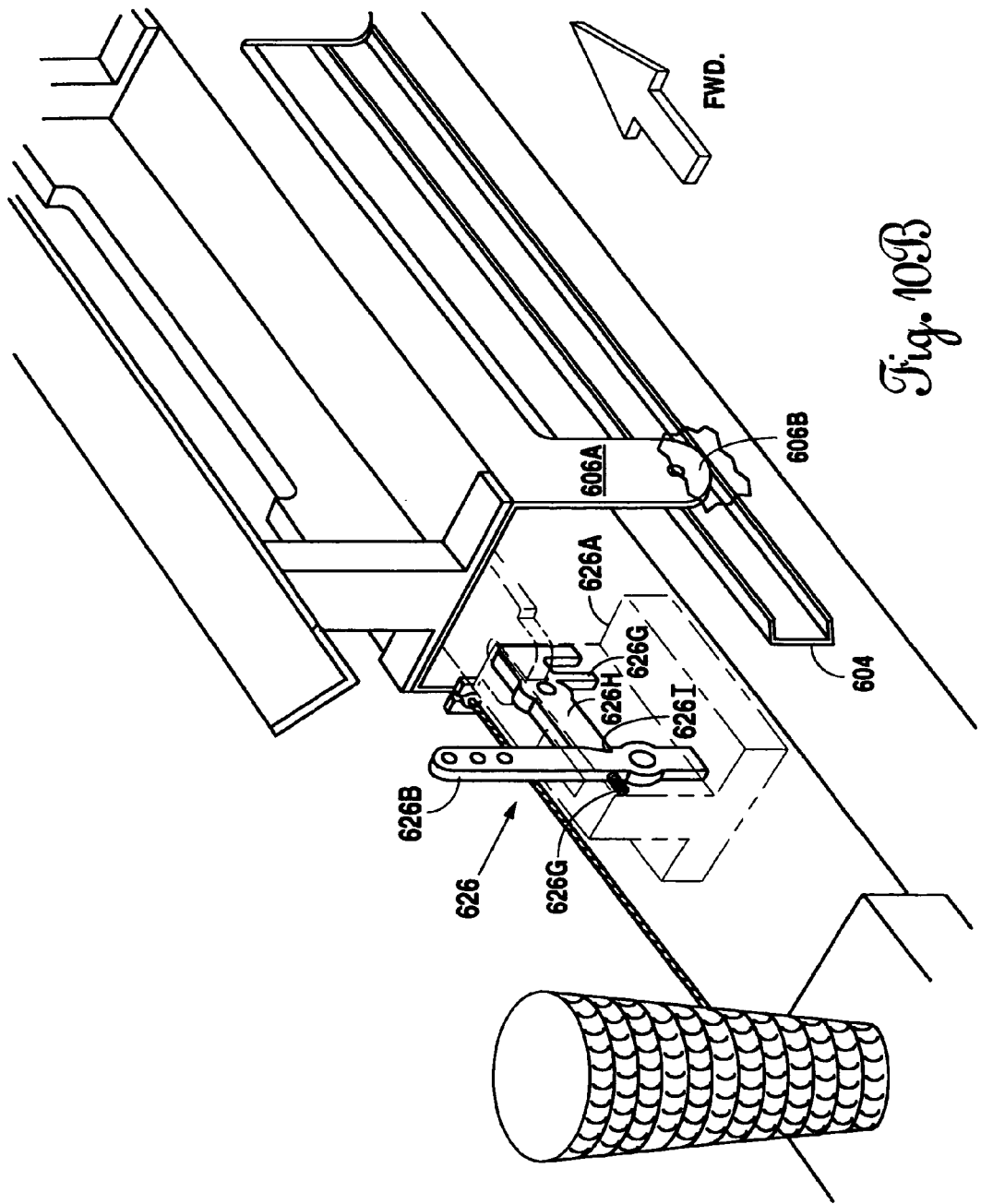

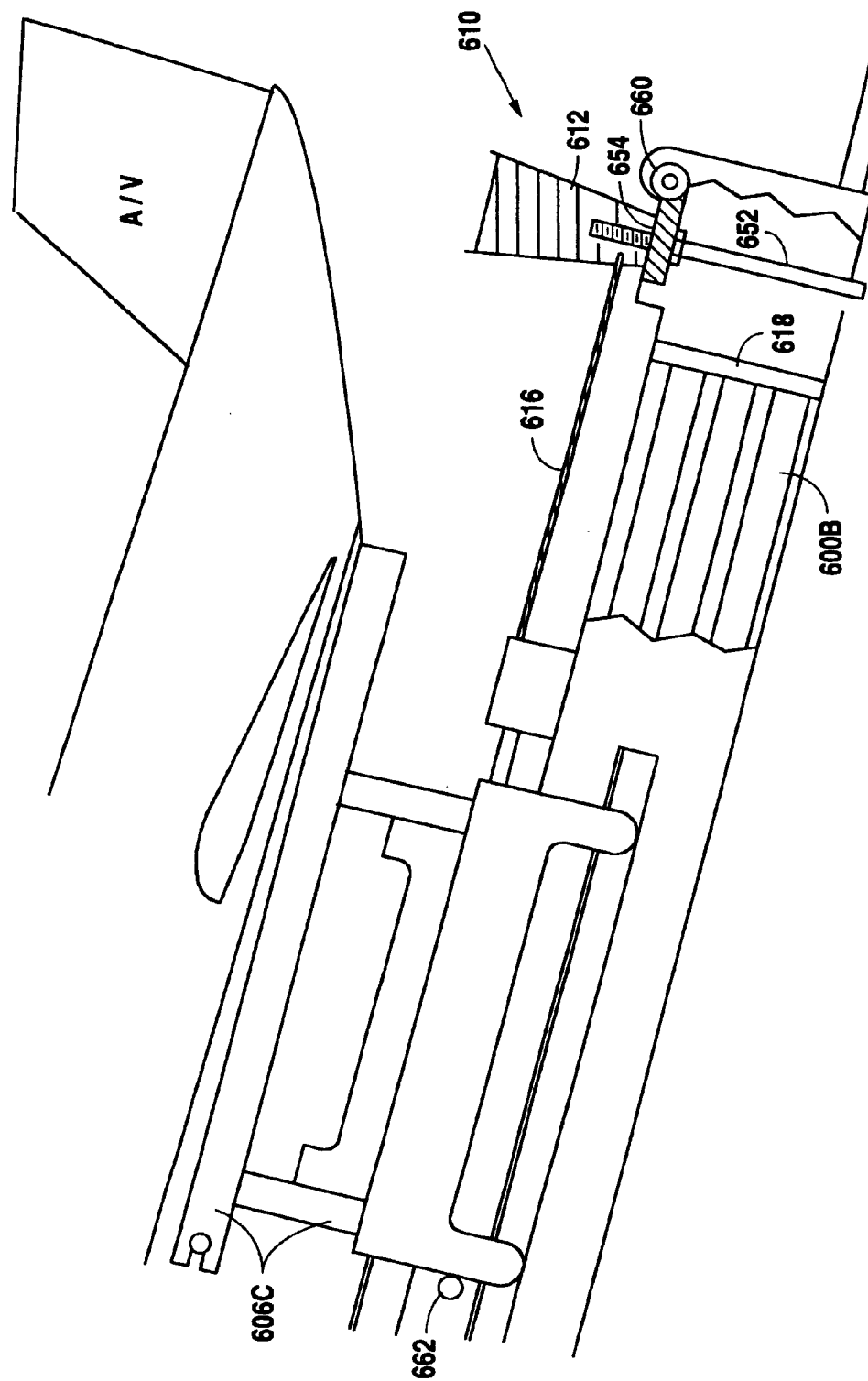

UNMANNED AIRBORNE RECONNAISSANCE SYSTEM

This application is based on and claims priority from provisional patent application Ser. No. 60/305,278, filed Jul. 13, 2001. This application claims priority from and incorporates by reference the specifications and drawings of Ser. No. 10/143,603 filed May 10, 2002.

BACKGROUND OF THE INVENTION

1. Field of the Invention

Applicant's invention relates to small, unmanned airborne reconnaissance vehicles.

2. Background Information

Presently, unmanned airborne reconnaissance vehicles are used by military forces in a limited fashion. Most are too large (typically several hundred to several thousand pounds) to be effectively deployed by a single person or a two-man team. Those that are light enough are not compact enough, not in their payload or flight system sufficient for the requirements of many reconnaissance missions, especially "over the hill" short range, short duration missions.

SUMMARY OF THE INVENTION

It is an object of the present inventions to provide a lightweight (typically less than about 10 pounds), backpackable, image transmitting, ground controllable, programmable, self propelled, unmanned, airborne reconnaissance vehicle for short range (typically less than 6 nautical miles) work that will set up quickly and be launchable from almost any terrain.

With reference to FIG. 1, these and other objects are provided for in an unmanned airborne reconnaissance system (10), which system includes an unmanned airborne platform or vehicle (300) and a ground supported, airborne vehicle launch system (200), both elements of which are storable and transportable in a one-man backpackable container or box (100), the reconnaissance system also including a control system (400), some of the elements of which are on board the airborne vehicle (300).

BRIEF DESCRIPTION OF THE DRAWINGS

FIG. 3D is a front elevational view of an alternate preferred embodiment of Applicant's container which features built-in rails, here also showing an airborne vehicle engaged with the rails and ready for launching.

FIGS. 3E and 3F are side elevational views of the container featuring built in rails with the airborne vehicle in a launch ready launch position (FIG. 3E) and in a stowed position (FIG. 3F).

FIG. 5D illustrates a side perspective view showing further elements of Applicant's present invention, as well as the manner in which wings may be removed from the fuselage.

FIG. 5G illustrates a perspective view of Applicant's parachute recovery system.

FIGS. 6A, 6B and 6C are all perspective views of Applicant's launch system including the launch rail with the airborne vehicle attached thereto.

FIGS. 6D and 6E are detailed elevational views, close up, of some of the features of Applicant's launch rail.

FIGS. 6I and 6J are perspective views of a manner in which sections of Applicant's launch rail system may be joined together.

FIGS. 10A, 10B and 10C illustrate in perspective views details of the trigger assembly 626, the trigger assembly for engaging the carriage in a releasable manner to hold it firm while the carriage is loaded, until the trigger assembly is activated by the user, which allows the carriage assembly to fire forward.

FIGS. 11A and 11B illustrate perspective views of reel system 610, reel system 610 designed to pull the carriage from a forward position on the rail to a rearward or loaded position where the elastic cord is stretched.

DETAILED DESCRIPTION OF THE PREFERRED EMBODIMENT

Figure 1A:
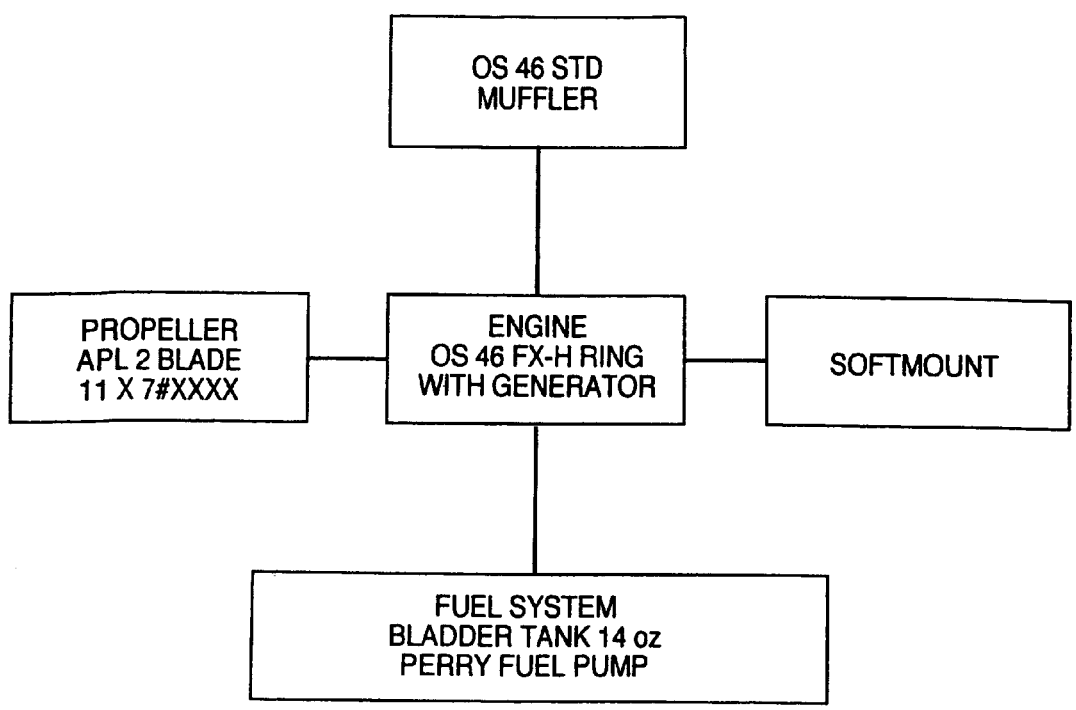
FIG. 1A illustrates in block diagram form elements of the airborne vehicle's propulsion system.
Figure 1B:
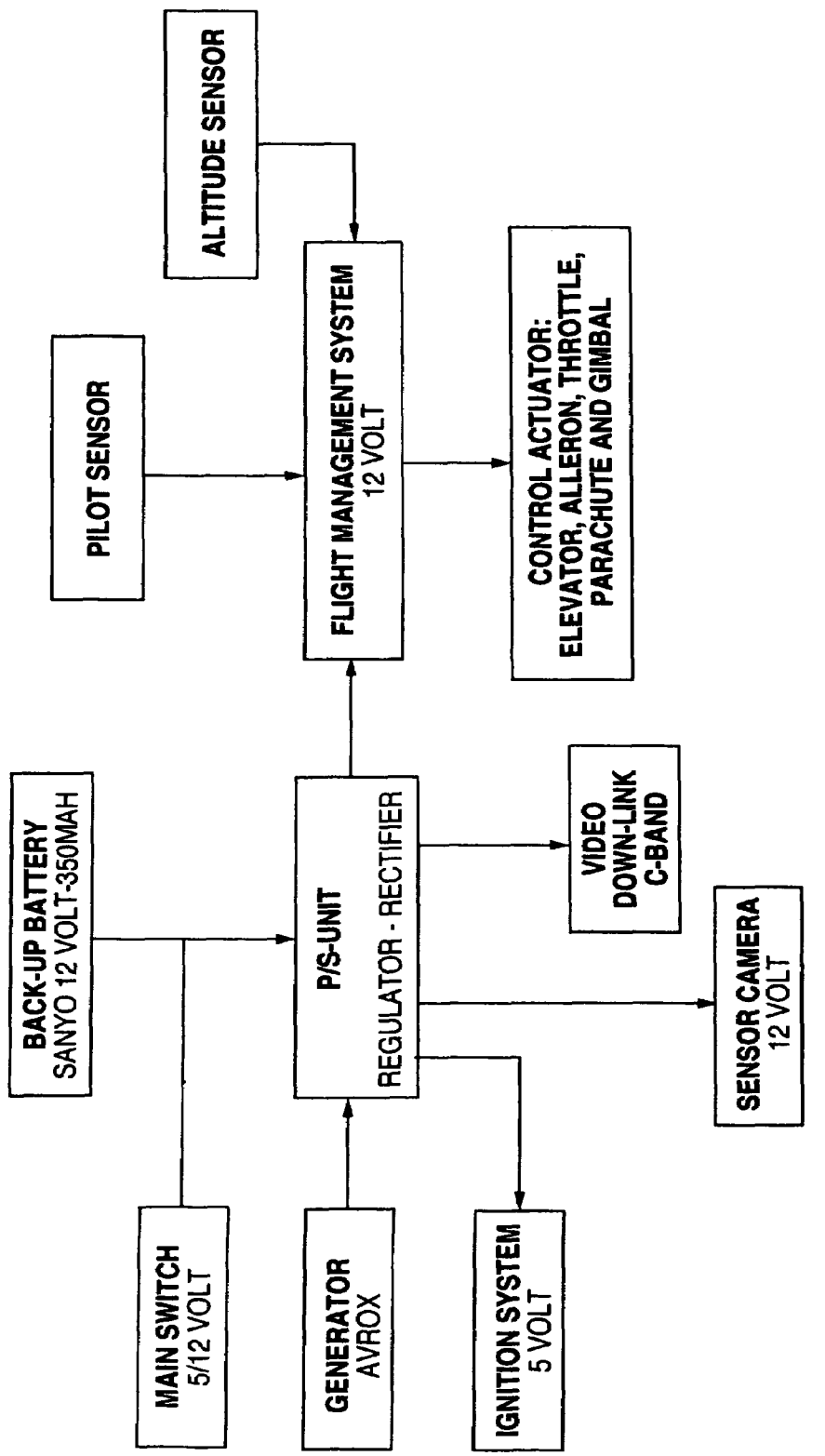
FIG. 1B illustrates in block diagram the onboard energy distribution of the airborne vehicle electrical system.
Figure 1:
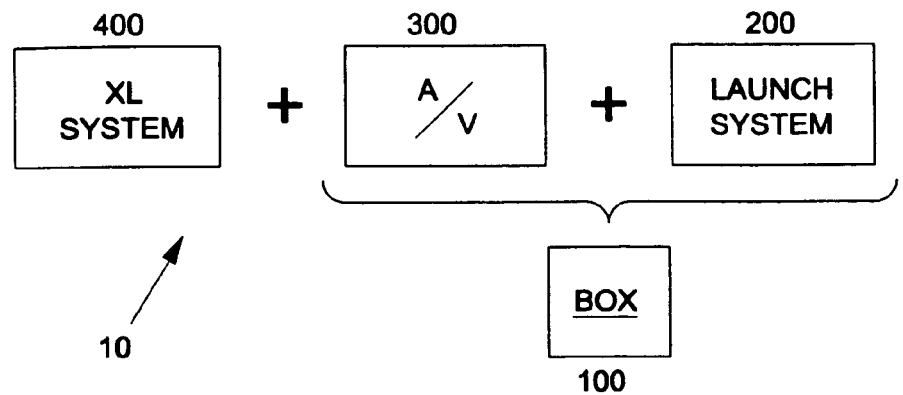
FIG. 1 is a schematic illustration of the major components of Applicant's reconnaissance system.

FIG. 1 illustrates the four basis components of Applicant's reconnaissance system 10. Applicant system includes airborne vehicle (300) that is launchable from a vehicle launch system (200), both of which components fit into a box (100) which is dimensioned to be carried by a single man, such as a foot soldier or parachuted in with a paratrooper. A second part of Applicant's system 10 is a control system (400) some of which includes components on board the airborne vehicle (300), which control system allows two-way telecommunication between the airborne vehicle and a ground control station.

FIG. 1A illustrates in block diagram form elements of the airborne vehicle's propulsion system. The airborne vehicle has a propulsion system that includes, typically, a single tractor mounted to the fuselage, here illustrated to be a 1.5 horsepower OS 46 FX-Hring, with an electrical generator. It is soft mounted to the bulkhead of the fuselage. It carries, typically, a two-blade APL propeller (here 11×7 # xxx). The fuel system of the engine includes a bladder tank with a Perry fuel pump delivering fuel from the bladder tank to the engine.

Figure 2A:
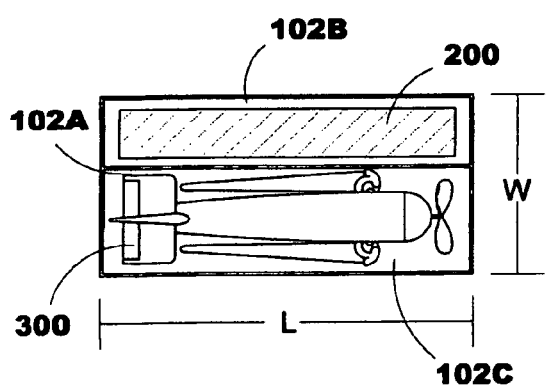
FIGS. 2A, 2B and 2C illustrate a top elevational view (with lid removed), side elevational view (with lid in place), perspective view (with lid and straps).

FIG. 2A illustrates the onboard energy distribution of the airborne vehicle electrical system. The electrical system is seen to include a generator and a backup battery, both the generator and the backup battery providing energy to a power supply unit including a voltage regulator and a rectifier. From the power supply unit energy is provided to the ignition system of the aircraft engine. Energy is also supplied to power a video downlink C-band, the video downlink for transmitting signals received from the camera to a ground control station. The power supply unit also powers the 12-volt DC camera.

The power supply unit distributes energy to the flight management system, typically a 12-volt DC system. The flight management system receives air pressure signals from a pitot sensor and an altitude sensor for indicating the airspeed and altitude of the aircraft. The flight management in turn controls, either pre-programmed or ground activated, the attitude of the aircraft through the use of elevator aileron and rudder servos as well as through controlling the throttle and the gimble mounted sensor (directional control of the camera) as well as activating parachute release (either pre-programmed or operator controlled).

Figure 2B:
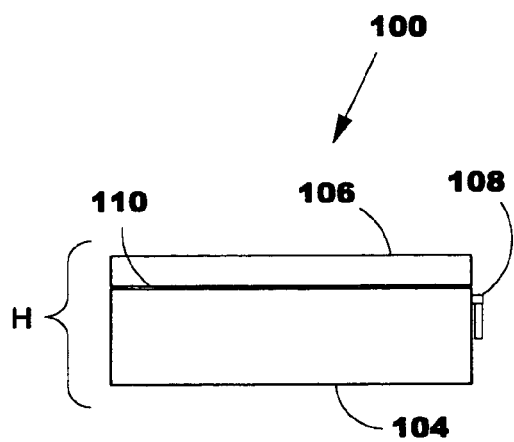
Figure 2C:
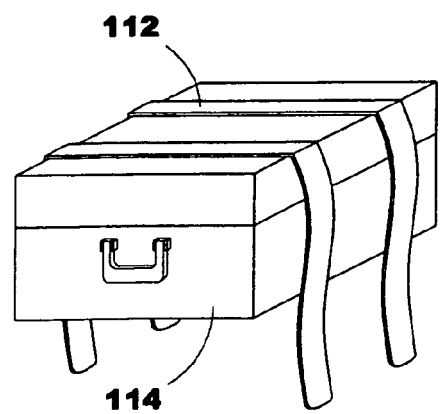

FIGS. 2A through 2C illustrate three views of the components of Applicant's system 10. The system is designed such that an individual can easily transport a launch system (200) and the airborne vehicle (300) over a variety of terrain, including difficult terrain and, in achieving such transportability, Applicant provides a box or container (100) which may be rectangular and made of cloth, aluminum, plastic, foam, a combination of these elements or any other suitable material or combination of materials which is light, weatherproof and durable. The box may be rectangular or any other suitable shape. Illustrated in FIGS. 2A through 2C is a box (100) which is rectangular, which box preferably but not necessarily is approximately 40 inches in length (L) and 16 inches in width (W) and 10 inches high (H). Box (100) includes walls defining an interior portion 102, the interior portion typically having a removable foam or other suitable partition member (102A) which will divide the interior into a launcher storage section (102B) and airborne vehicle storage section (102C), the partition member (102A) providing protection for the two elements to be contained within the interior from one another and assisting and providing for snug receipt of the airborne vehicle and launcher within interior (102). More specifically it is seen that the dimensions of the box and interior (102) are designed to snugly receive the launcher and airborne vehicle as illustrated in FIG. 2A. Box (100) may have a housing member (104) and a pivoting hinge (110) mounting lid (106) that may be locked in a closed position through the use of a lock (108). The use of a pivoting lid will allow easy access and removal of the launcher and the airborne vehicle from the box. Straps (112) may be provided to both maintain the box and lid together as a unit or to affix the box to a transport vehicle such as a Humvee or further to provide a means for attaching the box to a backpack or backpack frame to be carried by a foot soldier or military scout. Handles (114) may also be provided for ease in transporting the box and its contents.

Figure 2D:
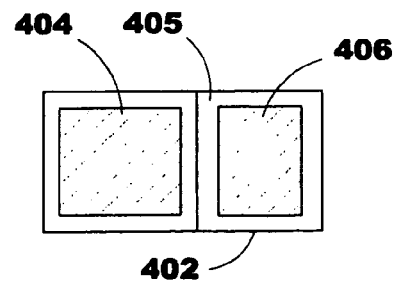
FIG. 2D illustrates a cross sectional view of box for carrying a ground control station and remote imaging system.

FIG. 2D illustrates utilization of a second box, here a control system box (402) which contains a partition member (405). This box is used to store and transport both on a mobile vehicle and by foot, elements of the control system (400) including a ground control station (404) and a remote imaging system (406).

It should be noted at this point that both system box (402) and box (102) are designed to handle a harsh environment that may include temperature ranges from −40° to +150° F. and humidity from 0% to rain. Indeed both these boxes may be waterproof and weatherproof with appropriate gaskets, weather stripping and sealed seams.

Figure 3A:
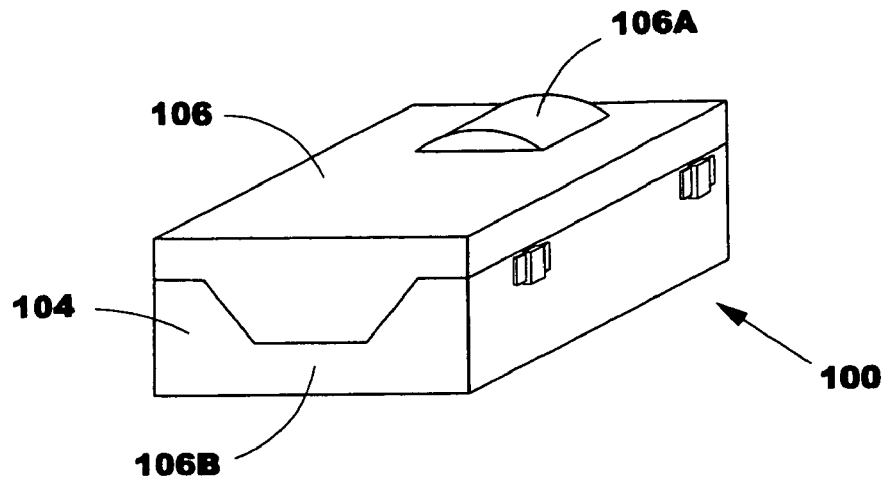
FIG. 3A illustrates an alternate preferred embodiment of Applicant's airborne vehicle container in perspective view.

FIG. 3A illustrates an alternate preferred embodiment of container (100) which embodiment is seen to include a projection (106A) and lid (106), the projection for providing room for a portion of the aircraft or launch system contained in the box. Also it is seen that the seam between the lid and the housing of the container may be shaped (106B).

Figure 3B:
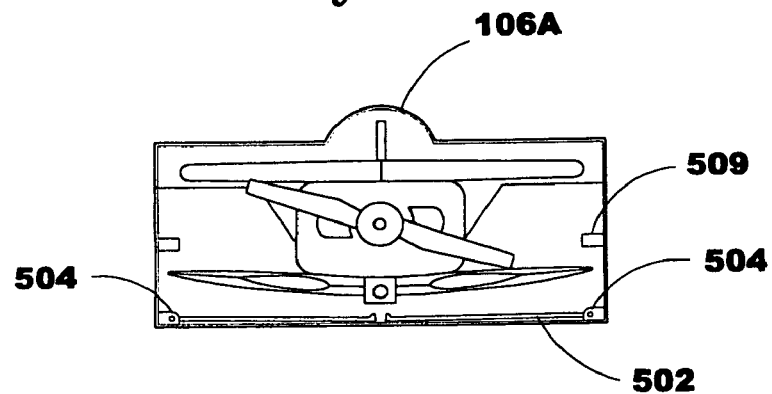
FIG. 3B is a front elevation cutaway view of an alternate preferred embodiment of Applicant's container with an airborne vehicle stored inside.
Figure 3C:
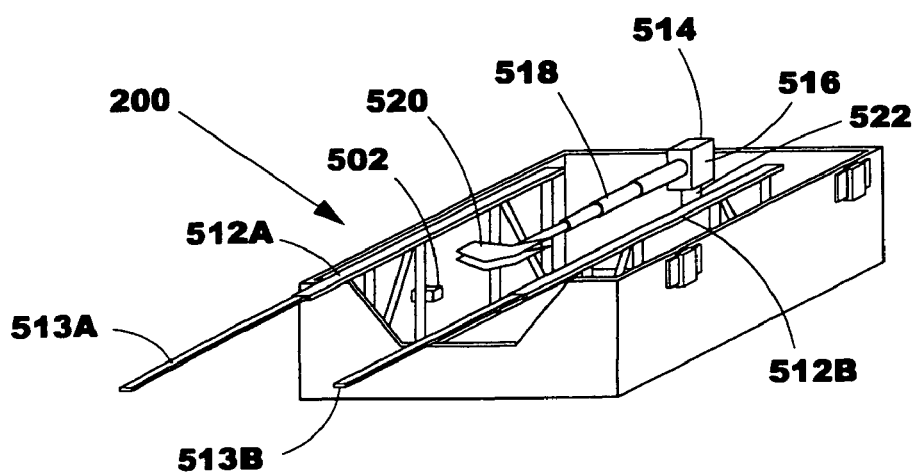
FIG. 3C is a perspective view of an alternate preferred embodiment of Applicant's container which features built-in rails for launching the airborne vehicle.
Figure 4A:
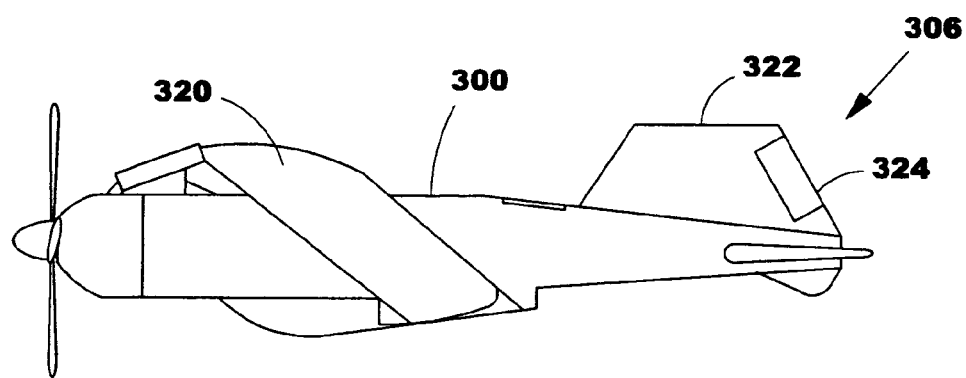
FIGS. 4A, 4B and 4C are side, front and top elevational views respectively of an airborne vehicle.
Figure 4B:
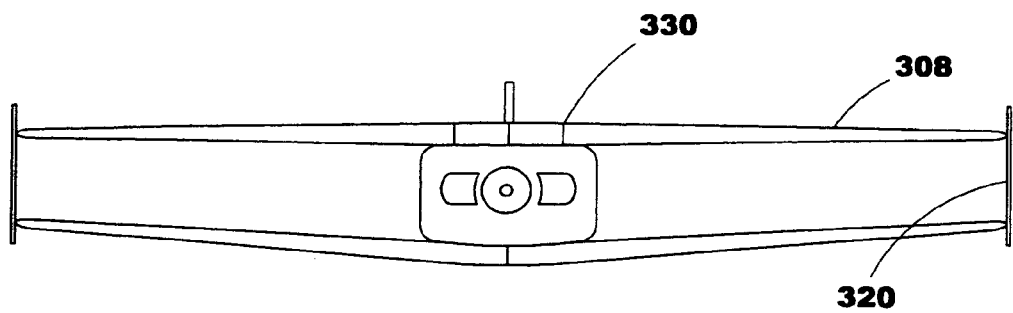
Figure 4C:
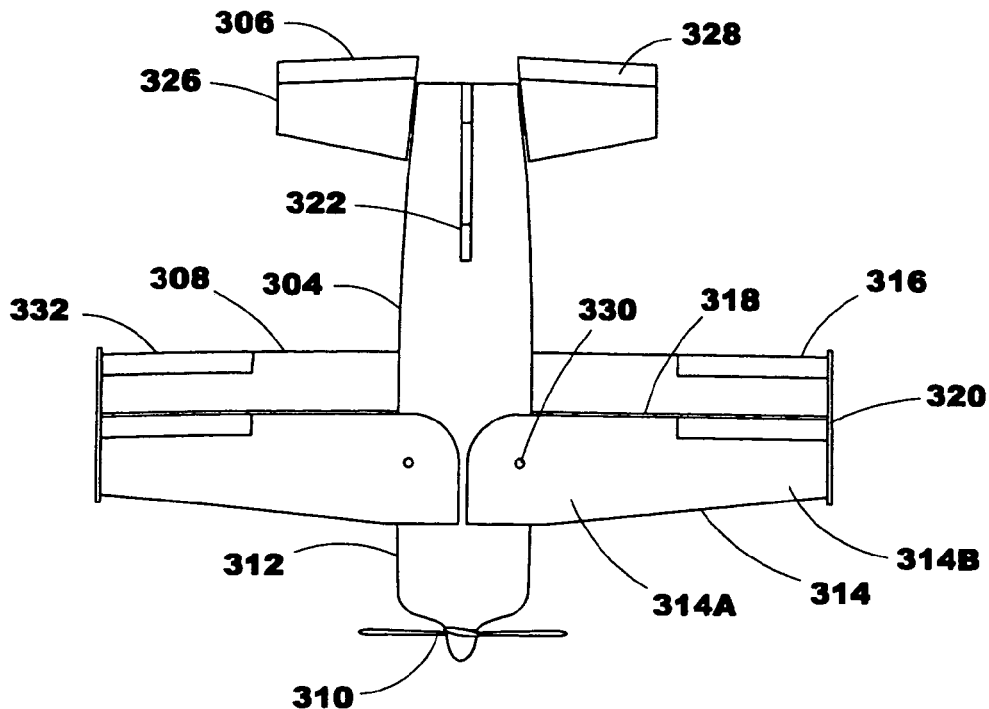
Figure 4D:
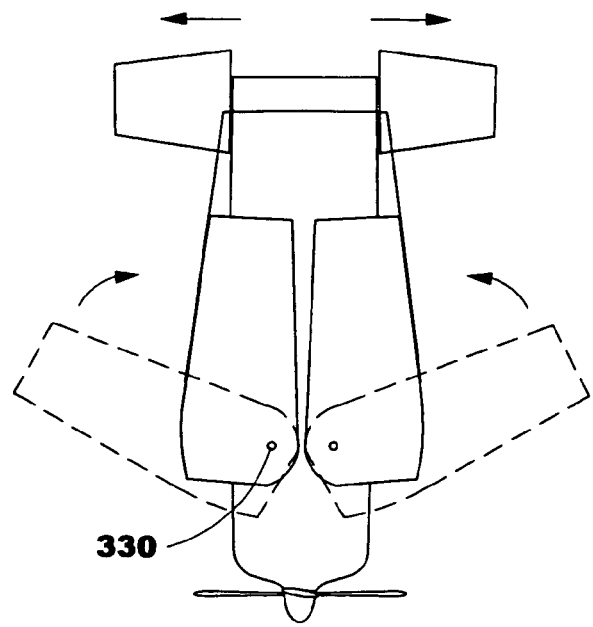
FIG. 4D is a top elevational view of the airborne vehicle of FIGS. 4A through 4C, except with the wings in a folded position.

FIGS. 3A through 3F illustrate various views of an alternate preferred embodiment of Applicant's present invention. In this alternate preferred embodiment of aircraft vehicle (300) it is seen that launch system (200) is integral with the container and includes folding legs (502), which folding legs are attached to a rotating leg support rod (508) (see FIG. 3E), the support rod being attached to and articulating on, box corner mounted brackets (504) such that the launch rail may have a pair of fold out longitudinal members (512A) and (512B) which longitudinal members are attached to the removed ends of folding legs (502) as seen in FIG. 3C. With further reference to FIG. 3C and FIGS. 3E it is seen that the longitudinal members may be made up of two or more sections that telescope one within the other or thread onto one another so that they may fit within the box when they are detached yet, when attached they may extend beyond the end of the box to assist in launching the aircraft.

The support rails are designed to support the aircraft during the process of its launching until the engine of the aircraft has reached sufficient speed to keep the aircraft airborne. Where aircraft will typically use a runway and be supported on wheels mounted on the fuselage or wings, where no runway is used, such as a military scout using the airborne vehicle "in the field," Applicant's launch system provides a means for controllably maintaining the aircraft on a straight course as it moves from a stationary position to flying speed.

Applicant's have provided in the embodiment illustrated in these figures a means for attaching a launch system (500) to box (100) and, further for storing launch system (500), as through the use, for example, of telescoping tubes and folding legs, within the interior of the box.

Here, longitudinal members (212A) and (212B) engage channels (302) on the under side of the wings or attached to the fuselage, or other parts of the aircraft, which channels are dimensioned to slidably accept the longitudinal members so as to maintain the airborne vehicle on a straight course over the longitudinal members as it accelerates to flying speed.

While the engine of the aircraft may be energized to accelerate the aircraft to flying speed Applicant's launch system (500) may include a power assist means (514), here engaged to the box and including a gas propellant means such as the cartridge of a firearm, which may propel the aircraft through means including telescoping tubes (518) with aircraft engaging bracket (520) on the removed ends thereof. Note that gas propellant means (516) may include a trigger (522) for remotely activating a cartridge of other gas propellant means to drive the aircraft over the launch longitudinal members. Launch system (500) includes crossbracket (510) to assist in bracing and maintaining the longitudinal members in their proper position. Stops (509) may help brace folding legs (502) adjacent the sidewalls of the box (100) (See FIG. 3D). FIG. 3E illustrates the manner in which aircraft engaging brackets (520) may receive, in a slot thereof, the trailing edge portion of the lower wing. Any other suitable means may be provided for engaging the aircraft to the power assist means to propel the aircraft from a stationary position at a near end of the longitudinal members to flying speed as it reaches the removed end of launch system (500). FIG. 3E also illustrates that the attitude or angular relationship between the ground and a longitudinal axis of the launch rail may be adjusted by using legs (122) between a lower surface of the box (100) and the ground to raise the longitudinal members and the launch system. Furthermore, the box, and therefore the launch systems may be firmly anchored to the ground through of "L" brackets (116) and pegs (120) such that when the power assist means (514) is activated the box and the launch system will stay firmly implanted on the ground and the aircraft will move forward on the launch rail. It is noted that longitudinal members (512A) and (512B) may have either telescoping extensions or threaded attachments that can be threadably detached and stored in the box.

FIGS. 3B, 3D, 3E, 3F, 4A through 4D illustrate additional views of an alternate preferred embodiment of Applicant's airborne vehicle (300). An immediate feature to be appreciated is that the wings of the aircraft articulate with the fuselage so they fold with respect to the fuselage and lay adjacent the fuselage (for storage) as illustrated in FIGS. 3B and 3F, by pivoting on pins (330) (see FIGS. 4B and 4C). Airborne vehicle (300) is seen to have fuselage (304) including, at a removed end thereof empennage (306), and between the empennage and nose (312) are wings (308). The alternate preferred embodiment of airborne vehicle (300) illustrated is tractor driven having a propeller (310) at the nose (312). Wings (308) are seen to be in staggered configuration and including a forewing (314) located adjacent an upper surface of the fuselage and an aftwing (316) located adjacent a lower surface of the fuselage. In the top elevational view illustrated in FIG. 4C it is seen that the two wings have a gap (318) between a trailing edge of the forewing and a leading edge of the aftwing. Wings are seen to include, as here illustrated, forewing (314), wing root (314A) and wing tip (314B). The wing tips of the forewing may be truncated as may be the wing tips of the aftwing and may be joined together through the use of detachable endplates (320).

The empennage is seen to include a vertical stabilizer (322) having a rudder (324) thereon and horizontal stabilizer (326) having an elevator (328) thereon, the empennage to control pitch and yaw in a manner known in the prior art. Wings (308) are seen to include ailerons (308) for roll control in a manner known in the prior art. Ailerons may be coupled, with both the forewing and aftwing having aileron controlled surfaces or, in an alternate preferred embodiment, only the aftwing may have aileron control surfaces. In an alternate preferred embodiment, Applicant provide servo activated flaps. Note that the wings are positively staggered, with the upper wing being located forward of the lower wing.

Figure 5A:
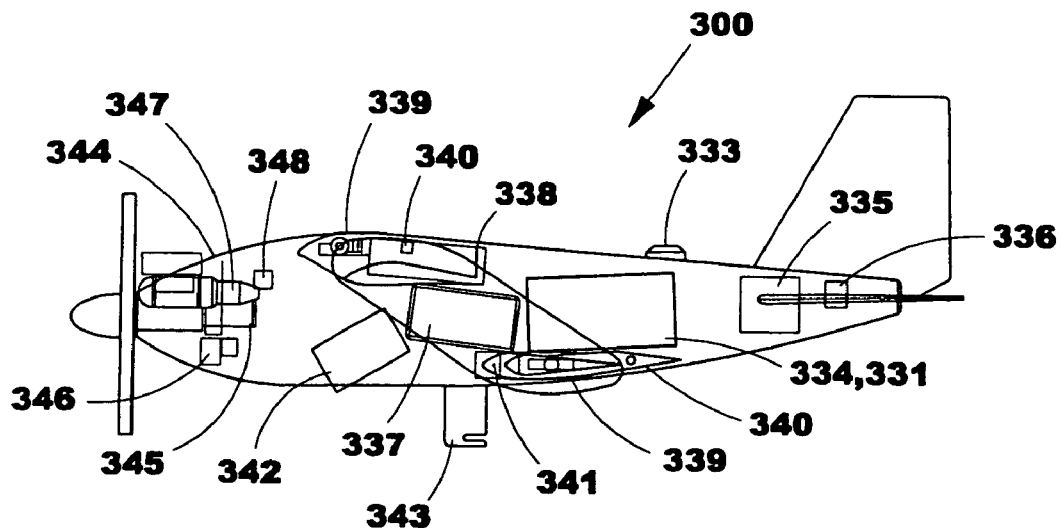
FIGS. 5A and 5B illustrate side elevational cross-sectional views of an airborne vehicle illustrating some of the components contained therein and engaged therewith.
Figure 5B:
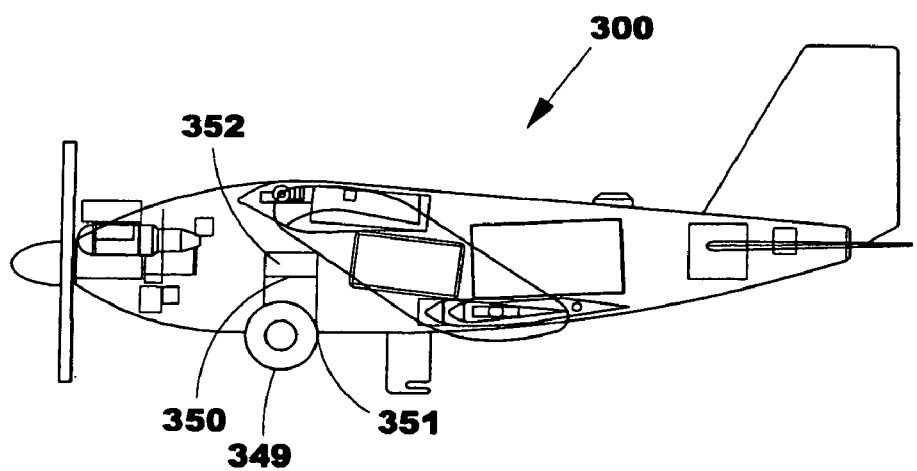

FIGS. 5A and 5B illustrate an alternate preferred embodiment of airborne vehicle (300) with removable wings. In this embodiment it is seen that airborne vehicle (300) includes a small modular self-contained G.P.S. (global positioning system) Unit (331) internal with the flight management system module (334). The G.P.S. Unit is attached to G.P.S. antenna (333) here mounted near the base of the vertical stabilizer.

A flight management system module (334) is included within the fuselage for management of flight systems as herein set forth. The aircraft may include a camera for visible spectrum or infra-red reception, and may also include a video transmitter such as C band video transmitter (335) located within the fuselage. FIGS. 5A and 5B also illustrate elevator and rudder servos (336) for controlling the elevator and rudder surfaces. A lightweight plastic 14 ounce fuel tank (337) is also provided within the fuselage. A parachute recovery system (338) also attaches in modular fashion to the interior and on surface portions of the fuselage. (See FIG. 5G).

Applicants also provide a wing removal mechanism (339) that will allow the wings to be detached from the fuselage for placement adjacent to the fuselage within the box or container (100). The removal mechanism includes a wing alignment pin (340) for attaching the wing to the fuselage at the proper angle. Applicants forewing and aft wing are attached at the wing tips and include wing tip fastener (341) for removably attaching the endplates to the wing tips.

Applicants airborne vehicle is intended as a miniature aircraft to perform "recognition, intelligence, surveillance, and target acquisition" missions for taking video photographs in the infrared or visual spectrum of the ground surface over which it flies and transmitting the images on an analog signal back to a ground control station for visual display. As part of that system Applicants airborne vehicle (300) may include an infrared (or visual spectrum) sensor or camera (342) as seen in FIG. 5A rigidly attached to the fuselage of the aircraft and directed downward when the aircraft is in normal flight with its wings level and fuselage level to the horizon. In this fashion pre-programmed or remote control of the three axes of the aircraft will control the area of exposure on the ground to the camera and therefore to the military scout in attendance at a remotely located visual display. The flight management system allows the scout full three axis control of the aircraft so as to effectively direct the camera at the will of the operator. The flight management system may be pre-programmed or reprogrammed or real time controlled to focus on a fixed, selected ground target.

Figure 7A:
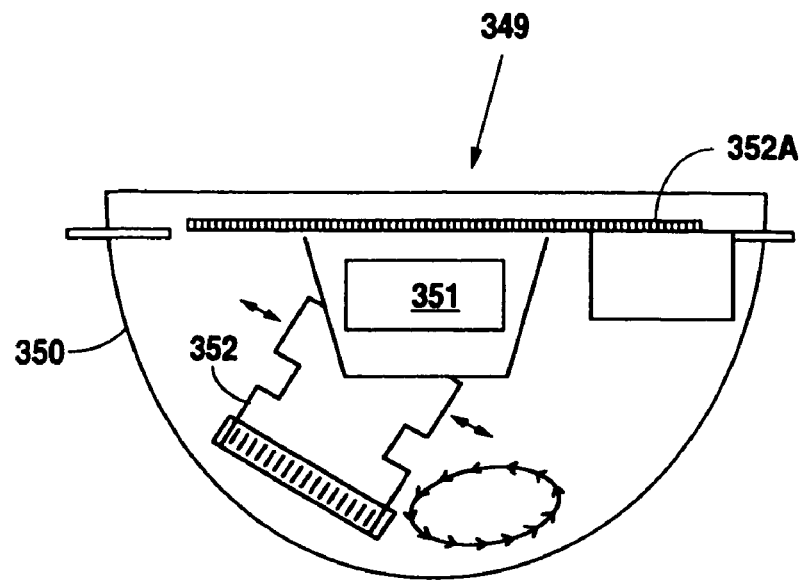
FIG. 7A illustrates in a side elevational view details of a pan and tilt perspective system for use with Applicant's airborne vehicle.

FIG. 7A illustrates detail of a preferred embodiment of the camera pan and tilt system (349) within globe (350). Servo (351) is capable of moving camera (352) in a side-to-side motion. Camera (352) is also capable of 360° rotation on servo-controlled gear (352A).

FIG. 5B illustrates an alternate preferred embodiment of Applicants' present invention which embodiment contains a camera pan and tilt system (349), the pan and tilt system (349) located adjacent the underside of the fuselage typically between the nose and empennage and including an at least partially transparent globe. This pan and tilt system (349) includes a camera (352) mounted on a pan and tilt gimbal and servo mechanism (351). The pan and tilt gimbal and servo mechanism provides means to move camera (352) with respect to the fuselage. With this system airborne vehicle (300) can maintain straight and level flight yet the remote operator through the flight management system may aim the camera at various targets on the ground without changing the attitude of the aircraft. The flight management system includes an autopilot with aircraft attitude sensors and servos to activate control surfaces to maintain a course. In a preferred embodiment of Applicants' invention the autopilot may engage gimbal and servo mechanisms (351) to keep the camera directed to a selected target. Globe (350) provides protection for the camera and the pan and tilt system. The pan and tilt gimbal servo mechanism will allow the camera to move up and down with respect to the horizon as well as side to side with respect to the horizon while the aircraft maintains its attitude.

Figure 5C:
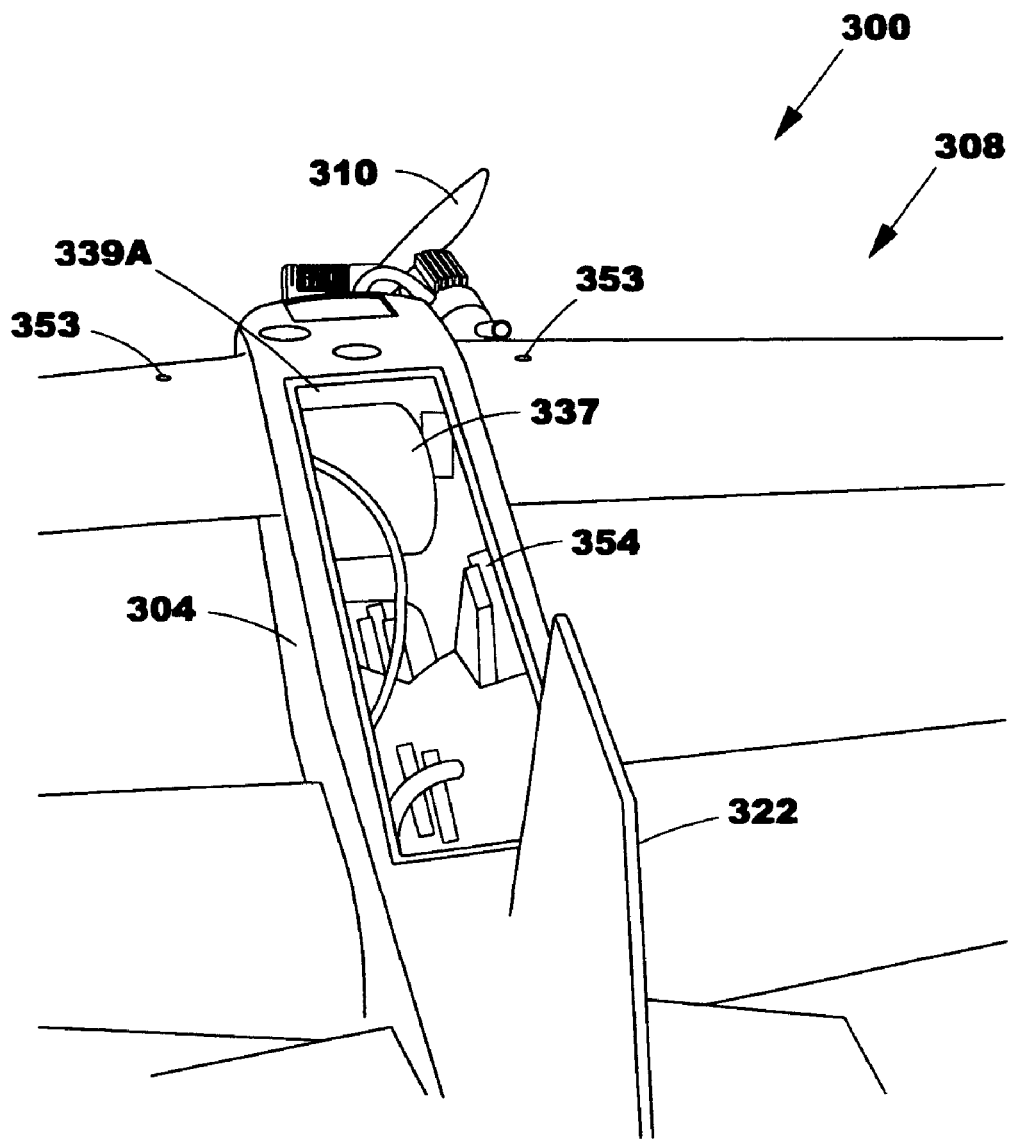
FIG. 5C illustrates a perspective view of portion of the fuselage of the airborne vehicle of Applicant's present invention showing a fuselage cutout for the removal of elements within the fuselage.
Figure 5E:
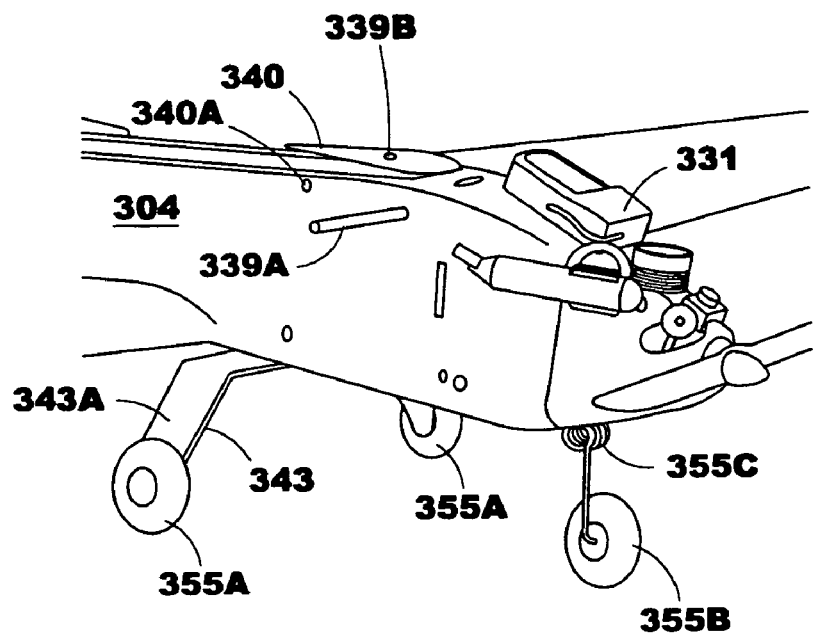
FIG. 5E is a side perspective view of the airborne vehicle with one of the wings removed and showing a nose gear, engine and other details of Applicant's airborne vehicle.

FIGS. 5C, 5D, and 5E illustrate, in photograph form, additional features of an alternate preferred embodiment of Applicants' present invention as set forth in FIGS. 5A and 5B. It is noted with reference to FIGS. 5C, 5D, and 5E that the wings separate from the fuselage for removal therefrom and for laying adjacent the fuselage when placed in a container. That is, a wing removal mechanism will allow the wings to be placed adjacent the fuselage, typically so that the longitudinal axis of the fuselage is coincident with the longitudinal axis of the wings. In the embodiment illustrated in FIGS. 5C, 5D and 5E note that wings (308), fore and aft are physically removed and separated from the fuselage and then laid adjacent thereto, through the use of a wing root anchor (339A) which extends through the fuselage (304), including the outer walls thereof, perpendicular to the longitudinal axis of the fuselage. Note further, with respect to FIG. 5E, there is a channel (339B) in the root of the wing for snug receipt of the wing root anchor therein. Fasteners (353) extend through the skin and core of the wing root into the removed end of the wing root anchor (339) to prevent separation of the wing from the wing root under shear loading. Note also with respect to FIG. 5E wing alignment pin (340) will fit into channel (340A) of the fuselage to prevent rotation of the wing about the wing root anchor. Thus, in the embodiment illustrated in FIGS. 5C, 5D and 5E it is seen that the wings may be slidably received onto an anchor member and removed from the fuselage with the removal of one fastener per wing section.

Turning now to FIG. 5C it is seen that fuselage (304) has a flat top with a top fuselage cutout (354) therein. Fuselage cutouts may be located in sidewalls or even the bottom of the fuselage. The cutout may be used to mount a cover therein for removal of elements carried within the walls of the fuselage such as elements of a flight management system, C-band video transmitter, fuel tank, electrical system and other components. Furthermore, at least a portion of a top fuselage cutout (354) may serve to store therein parachute recovery system (338) (See FIG. 5G).

Figure 6B:
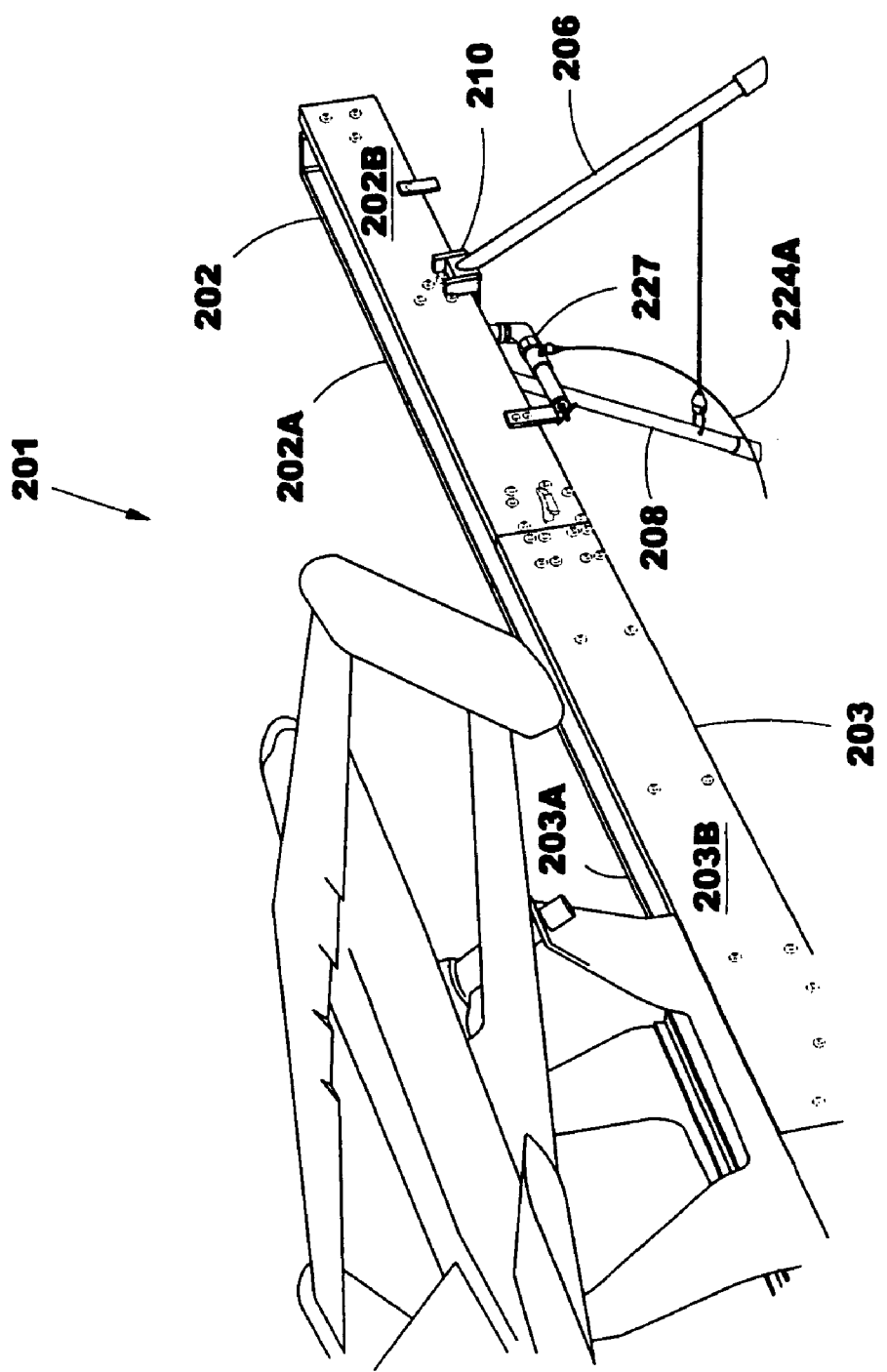

Note also with reference to FIGS. 5D and 5E that launch interface bracket (343) is incorporated into a tricycle landing gear (355) and contains a slot (343A) for slotting onto a launch rail or launch device as set forth in FIGS. 6A and 6B. Tricycle landing gear (355) includes main wheels (355A) and nose wheel (355B). With the use of wheels as part of a landing gear in addition to the slots of launcher interface bracket (343) as illustrated in FIGS. 5A and 5B, the operator of airborne vehicle (300) has the option of making a normal nonlauncher takeoff (runway) as well as a nonparachute return (typical runway landing). Further, it is seen that tricycle landing gear (355) has some resilience or "give" between the fuselage and the wheels through the use of an aluminum main gear and a spring (355C).

Figure 5F:
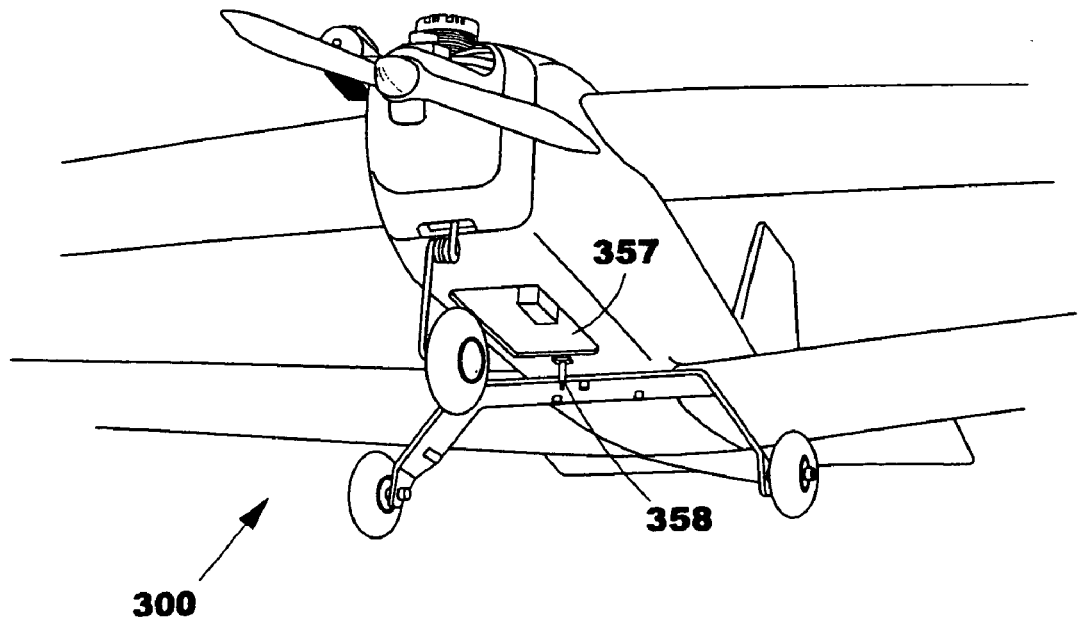
FIG. 5F is a perspective view taken from the front and below illustrating a camera bay, landing gear and other elements of Applicant's airborne vehicle.

The nose wheel may be steerable, coupled to the rudder for improved ground handling during conventional ground handling, taxiing, take-off, and landing. Fuselage (304) may also includes cooling ducts (356) seen in FIG. 5D to be located in the sidewalls of the fuselage for cooling components within the fuselage. Note also with references to FIG. 5E that G.P.S. Unit (331) is externally mounted to the fuselage, but may be placed internal to the fuselage, and is removably attached with velcro or other means. FIG. 5F illustrates an additional view of airborne vehicle (300). This view illustrating a sensor (camera) bay (357) for placement of the camera, and, optionally, a globe, gimble and other elements of a pan and tilt system (349) therein. Also, illustrated in FIG. 5F is a C-Band transmitter (358) for transmitting signals to the ground control station and optionally a (signal receiving only) remote imaging system.

Applicants achieve a number of the design goals in the system set forth herein. The aircraft is lightweight and compact. This is achieved through the use of lightweight materials such as carbon fiber, aluminum, foam, and balsa wood used in the fuselage wings, engine, and other elements of the system. It is also lightweight and compact due to its staggered wing configuration with the wing length typically less than the length of the fuselage and with end plates providing additional structural integrity. With the staggered wing configuration, more surface area, and therefore greater carrying capacity can be achieved in an aircraft with a limited wing span.

Applicants' use of a generator on the aircraft engine allows for the generation of electrical power for onboard systems, eliminating the excess weight of additional batteries. The use of a gas/oil mixture instead of methanol to fuel the engine also reduces the weight of the aircraft by providing greater range per given mass of fuel.

The launcher is designed to easily assemble and breakdown and fit into a container, without the use of tools. Furthermore, it is rail launched using a propellant applied controllably to control the initial G-loading to the aircraft.

The aircraft achieves a high power to weight ratio, here for example illustrated with a 1.5 horsepower engine in an aircraft achieving a design weight of about 10 pounds with a full fuel load. The aircraft typically uses a cruise prop to achieve better gas consumption. The switch from methanol to gas also allows for a better fuel consumption rate.

Figure 5H:
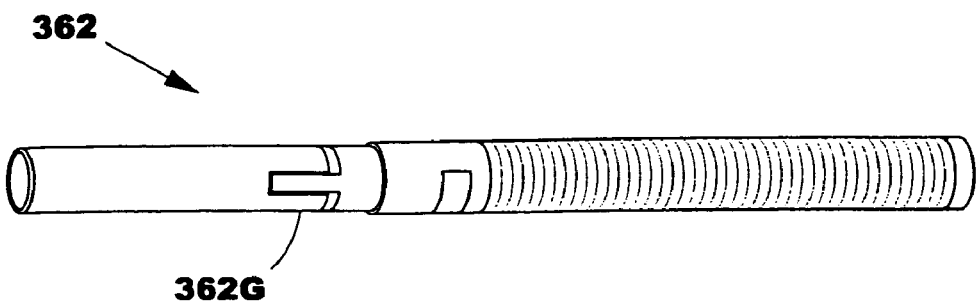
FIGS. 5H, 5I and 5J illustrate Applicant's novel wing hinge in different positions.
Figure 5I:
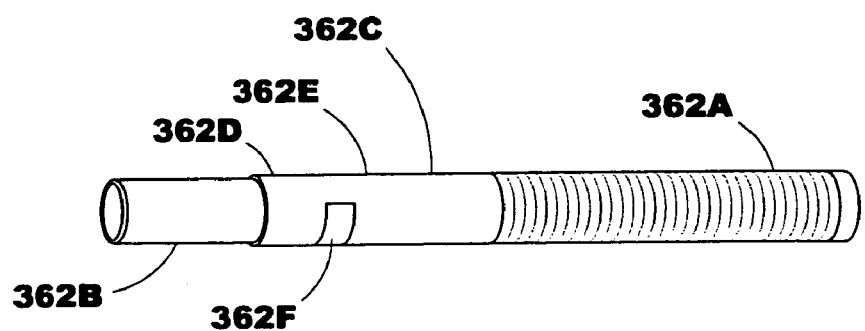
Figure 5J:
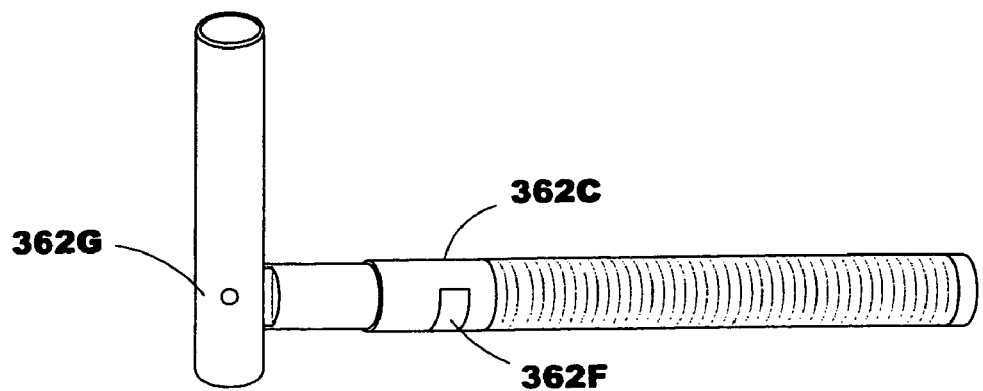

FIGS. 5H through 5J illustrate details of Applicant's unique wing hinge (362). The wing hinge allows the wings of the aircraft to stay attached to the aircraft, but allows them to be moved slightly away from the fuselage and rotated so they can lay parallel to an adjacent fuselage. This function is achieved by providing wing hinge assembly (362) with a cylindrical hollow sleeve (362A) into which an aluminum rod (362B) is snugly, slidably received. Mounted on the rod is a pin projecting slightly away from the surface of the rod, the pin for sliding in a slot (362D) defined by walls in the surface of the sleeve. The slot has two portions, an elongated leg portion (362E) and, perpendicular thereto, and circumferentially described in the walls of the sleeve, is a foot portion (362F). The width of the slot is just slightly larger than the diameter of the pin, and the height of the pin extends above the walls of the slot so the pin will confine the movement of the rod in the sleeve to the path transcribed by the "L" shaped slot. It is seen with reference to FIGS. 5H, I and J that the rod may slide within the sleeve longitudinally along leg (362E) and then may rotate, here approximately 90 degrees along the path transcribed by foot (362F). Note with reference to FIG. 5H that rod (362B) includes a folding hinge (362G) which allows the perpendicular folding or rotation of a removed portion of the rod with respect to an enclosed portion of the rod—the removed portion of the rod being that portion of the rod exposed from the sleeve when the rod is at its fully extended position (FIG. 5H) and the pin is against the walls defining the foot of slot (362D). FIG. 5J illustrates the removed end of the rod, pivoted or rotated about 90 degrees with respect to the enclosed portion of the rod.

With the understanding of these features of wing hinge assembly (362), it may be appreciated that if sleeve (362) is rigidly mounted partially within the fuselage and perpendicular thereto with some portion extending perpendicularly outward from the fuselage side walls (see FIG. 5D) (339A) that the wing may be pulled out, when the wing is anchored to the removed portion of the rod and folded (FIG. 5J) with the wing root still attached to the removed portion of the rod. In other words, fasteners, not shown, can normally maintain the wing in a flight ready configuration with a fastener going through the wing, through the sleeve and into the rod. This fastener would be for fastening the elements together when the wing is in the position of a straightened end (see FIG. 5I). This fastener would be removable to allow the wing, still attached through a fastener located on the wing and through only the removed end of the rod, to be pulled out so that the pin rides along leg (362E) and then the wing could be rotated with the pin in foot (362F) and then folded on folding hinge (362G) to lay adjacent the fuselage for storage in the container.

Figure 6C:
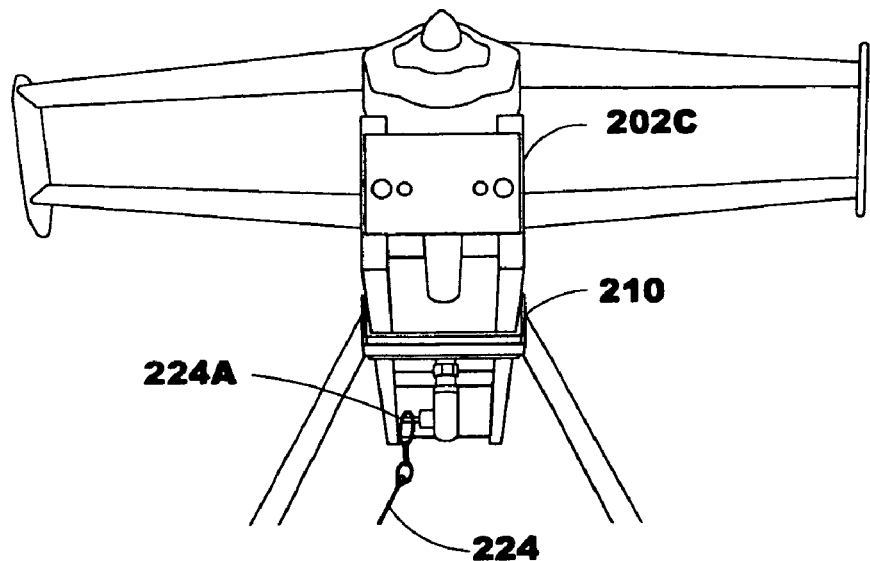

FIGS. 6A, 6B and 6C illustrate Applicant's launch system 200 with the airborne vehicle (300) attached thereto. Launch system (200) includes a longitudinal elongated rail member (201) comprised of a front section (202) and rear section (203). The two sections releasably joined. The front section is seen to have elongated plates, typically aluminum, defining side walls (202A) and (202B) that are laterally spaced apart relation to one another and each has an upward inward protruding lip. Likewise, the rear section includes a pair of elongated aluminum plate sidewalls (203A) and (203B) having an inwardly projecting lip on an upper surface thereof. Front section (202) has forward end (202C) and rearward end (202D). Rear section (203) has a forward end (203C) and a rearward end (203D).

Leg assembly (204) includes a pair of downwardly depending legs (206) and (208). The legs have a removed end for resting on a surface such as the ground, and a near end for pivotal attachment to a leg bracket (210), the bracket mounted to the underside of front section (202). This allows forward end (202C) to be raised with respect to a support surface, such as the ground and rearward end (203D) to rest against the ground.

Launch carriage (212) is designed to engage aircraft vehicle (300) to rail (201) in a slidable fashion such that propelling launch carriage (212) with airborne vehicle (300) thereon longitudinally along the upper surface of the rail will help propel aircraft vehicle (300) from a stand-still to launch speed before the carriage reaches forward end (202C) of front section (202).

Applicants include a cartridge chamber (220) having an elongated retractable spring loaded firing arm (222) engaged therewith. A lanyard (224) has a handle (226) at a removed end thereof, the lanyard having a near end (224A) where it is attached to a trigger (227) (See also FIG. 6D).

Figure 6D:
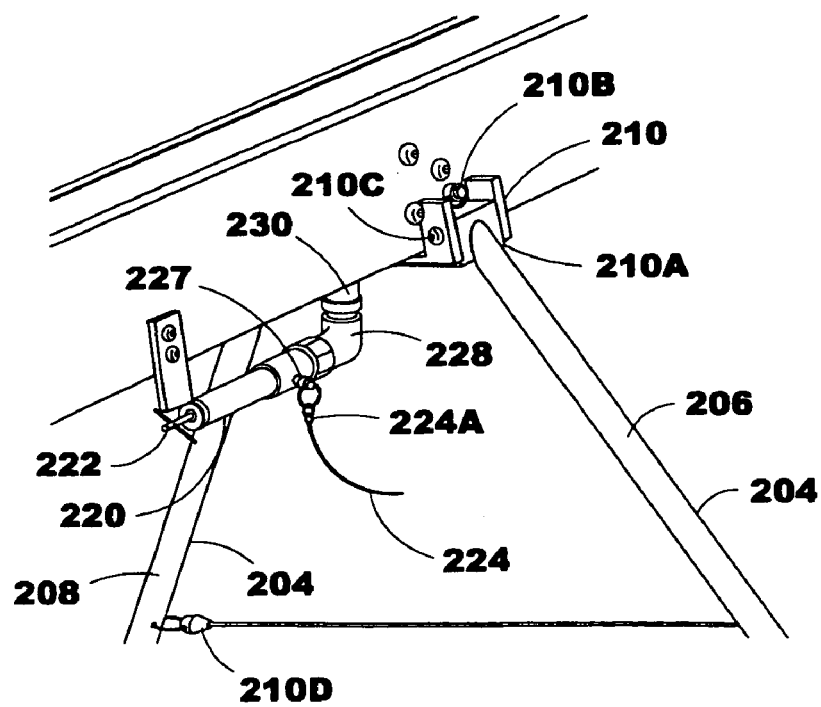

In FIG. 6D, additional elements of Applicants' leg assembly (204) and cartridge chamber (220) may be seen. Leg bracket (210) is seen to include a U-shaped channel (210A) with uprights for engaging two sidewalls of front section (202) and a cross member between the two uprights for engaging the bottom of front section (202) in the manner set forth in FIG. 6D. A pair of ball lock pins or other quick release, tooless fasteners (210B) may be used to fasten the U-shape channel to the sidewalls of the rail. Threaded fastener (210C) engaging the upright portion of U-shape channel (210A) also engages the near end of the two leg such that the leg can pivot inwards towards one another on the shaft of the fastener. Strap (210D) limits the outward movement of the legs. Lengthening or shortening the strap will also allow the forward portion of the rail to be raised or lowered accordingly. Further, the removed ends may be adjustably extendable by having telescoping members for telescoping within legs (206) and (208) so as to effectively raise or lower the angle the rail makes with respect to the ground.

FIG. 6D also features a closeup view of Applicants' cartridge chamber (220), illustrating a firing arm (222) that is retractable within the cartridge to detonate a chemical bearing cartridge which, with detonation will cause an explosion of gas through elbow (228) and fitting (230) for propelling the launch carriage as set forth in more detail below.

FIG. 6E provides additional details and structure of Applicants' means for providing propulsion to the airborne vehicle, which means are built into the rail and here are seen to include a cartridge chamber (220) attached to elbow (228) and a fitting (230) for engagement with a cylinder assembly (231), which cylinder assembly (231) includes a cylinder (230A) allow a piston and rod assembly (232) to slide into the interior walls. With the piston and rod assembly (232) extended as it is in FIG. 6E, gas entering the cylinder (230A) at the near end thereof will rapidly expand forcing rod (233) of piston and rod assembly (232) to the left as illustrated in FIG. 6E. The left or removed end of cylinder (230A) is vented to allow rod (233) to slide to the left as illustrated in FIG. 6E when an explosive charge of expanding gas enters cylinder (230A).

Figure 6G:
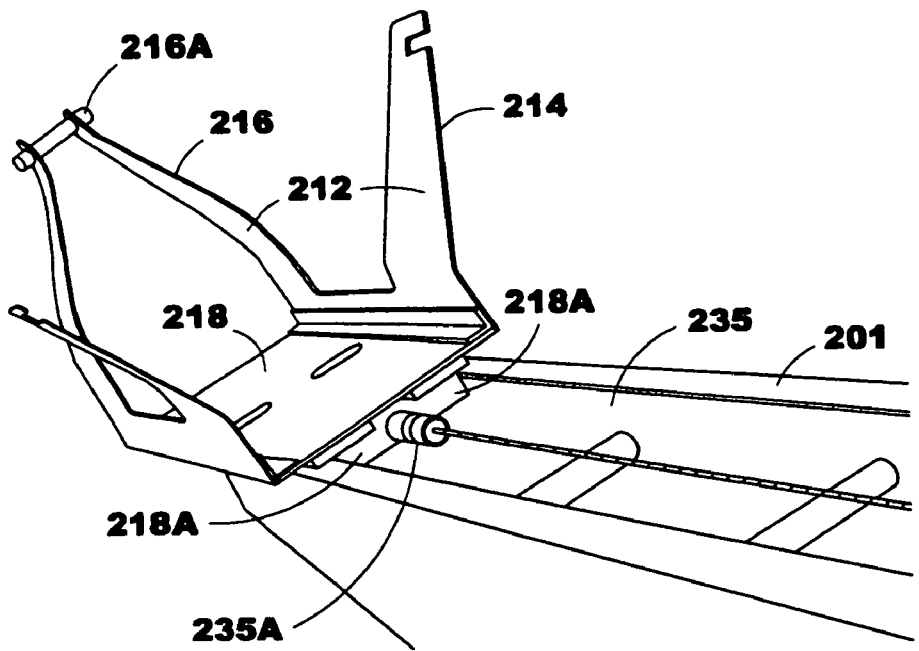
FIG. 6G is a perspective view of details of the launch rail system of Applicant's invention, including the carriage for engaging an airborne vehicle to the launch rail and elements of the carriage.
Figure 6H:
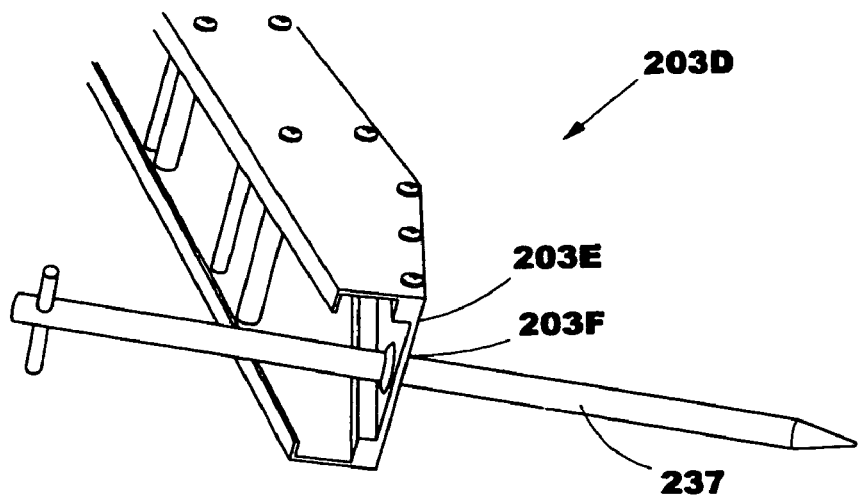
FIG. 6H is a perspective view of a manner in which the launch rail of Applicant's present invention may be affixed to the ground.
Figure 6F:
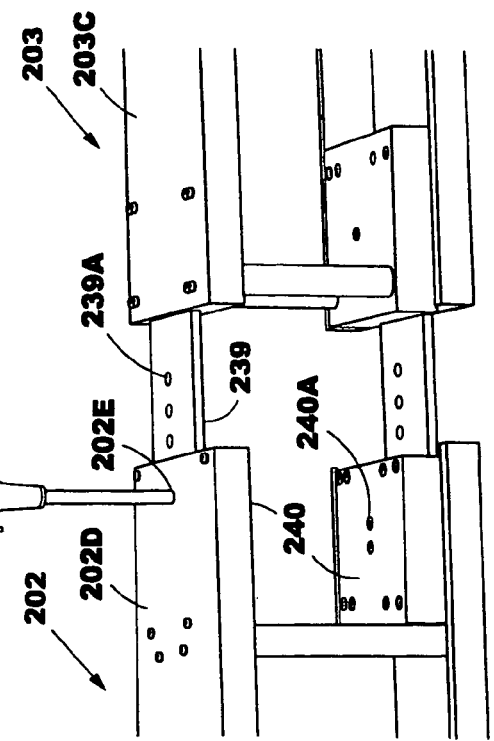
FIG. 6F is a detailed view in perspective of a pulley system for use with Applicant's launch rail.

Turning to FIG. 6F, it is seen that rod (233) has attached to its removed end a set of movable pulleys to (234) which are engaged with steel cable (235) to a set of end mounted fixed pulleys (236). The fixed and movable pulleys comprise a block and tackle system (237) for multiplying the distance moved by rod (233) into a greater distance covered by cable tethered launch cartridge (212). That is, cable (235) has a fixed end anchored to the block carrying the movable pulleys and a second or removed end attached to the launch cartridge. Between the two ends the cable is wound around one or more pulleys of movable pulleys (234) and around an equal number of fixed pulleys at forward end (202C). Two movable and two fixed pulleys will multiply the distance the rod moves by 2, and three sets will multiply the distance the rod moves by 3, etc.

One end of cable (235) is attached to the movable pulley assembly and the other end of the cable engages the launch carriage. When the cartridge is fired, expanding gas forces the rod into the cylinder causing the movable pulley assembly to move and the carriage assembly to move a multiple of the distance moved by the rod. Therefore, Applicants' system not only propels the airborne vehicle but does so including a means to multiply the distance over which the force is applied. This tends to smooth out the application of the force generated by a cartridge (not shown) such as a 45 caliber cartridge (without the slug portion, of course) being fired by the activation of the trigger and release of the firing arm (222) from its extended spring loaded position (spring inside cartridge chamber (220)) for impacting a firing pin into the cartridge.

FIG. 6G illustrates how a removed end (235A) of cable (235) engages launch carriage (212) to propel it forward along rail (201). Viewing FIG. 6G also affords an opportunity to appreciate additional details of the launch carriage and the rail. For example, it is seen that carriage base (218) includes slotted member (218A) whose slots slidably receive the inward projecting lips on the upper members of the side rails. Note again that much of the structure is made of lightweight metal such as aluminum which is strong and durable. Note that rear bracket (216) is made up of paired arms joined at their removed ends by a fastener (216A) which may engage the tail of the aircraft, mating to a hook on the tail as seen in FIG. 6A. Thus it is seen with reference to FIGS. 6A and 6G that the carriage assembly engages the aircraft at three points, a single point at the tail and two points along the main gear assembly to maintain the aircraft in a stable position as it accelerates along the rail during the launch process. The three point system also serves to protect the globe beneath the fuselage.

FIG. 6H illustrates rearward end (203D) of rear section (203) of rail (201). It is seen to include an angled base (203E) so as to present a flat surface to the ground or other support surface when the rail is in a use position, that is, with the legs beneath it and the front raised, with the aircraft ready to launch. Hole (203F) is sized to receive a stake (237) therein, the stake having a pointed end to facilitate receipt into the ground when the removed end has a force applied to it. This will help stabilize the rail and prevent it from moving with respect to the ground when a cartridge or other propellant means is fired.

Figure 6J:
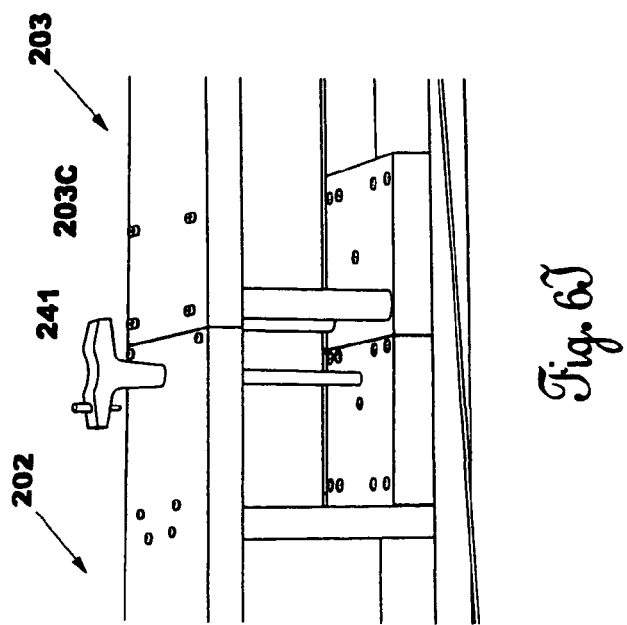

FIGS. 6I and 6J illustrate Applicants' means for joining front section (202) of rail to rear section (203). It is seen that one of the two members, here rear section (203) has at forward end (203C) and mounted on the inner walls of each of the plates making up rail (203), a tongue member (239) having holes (239A) drilled therein. Rearward end (202D) of front section (202) has a sleeve (240) attached on the opposing innerfaces thereof with the sleeve having holes (240A) drilled therethrough. The sleeve is dimensioned for receipt of the tongue such that the holes in the tongue and sleeve align with holes (202E) in sidewalls of front section (202). That is, the walls defining a rearward end (202D) have holes (202E) sized and located such that when the holes of the tongue and the holes of the sleeve lineup, they will lineup with holes (202E) of front section (202E). This alignment will allow a tooless fastener to (241) to fasten the two rail sections together and to resist shear loading on the rail.

Figure 6K:
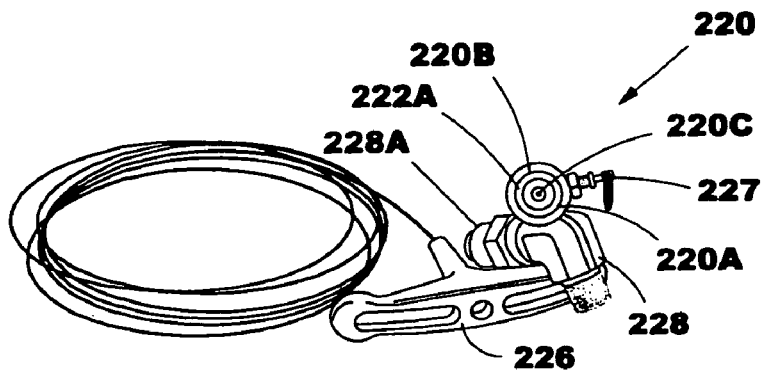
FIGS. 6K and 6L are perspective views of details of a propulsion system for use with Applicant's launch rail.
Figure 6L:
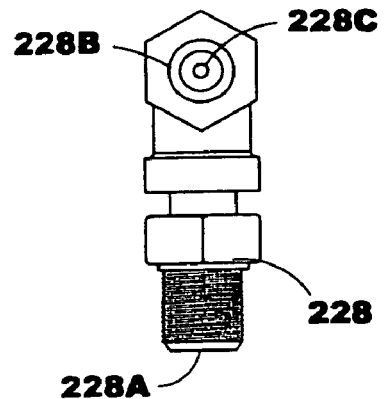

FIGS. 6K and 6L illustrate details of Applicants' cartridge chamber (220) and elbow (228). It is seen that cartridge chamber (220) includes walls defining a cartridge compartment for the receipt of a cartridge such as .45 caliper cartridge comfortably therein. A backing plate (220B) is provided for backing a cartridge thereagainst while threading cartridge chamber (220) into a near end (228A) of elbow (228). Backing plate (220B) has a hole (220C) centered thereon adjacent to where the firing cap of a cartridge would be located when cartridge chamber (220) and elbow (228) are joined. Firing arm (222) is spring loaded and includes a firing pin (222A) which when trigger assembly (227) is released will allow the firing arm to surge forward with the firing pin moving through hole (220C) and engaging the shell of the cartridge at the firing cap and causing detonation.

The sudden explosive charge and expansion of the gas resulting from this detonation may be diffused or slowed down by using a restrictor plate (228B) somewhere between the cartridge assembly and the cylinder. Restrictor plate (228B) with a small orifice (228C) is shown to be located and threadably received within the elbow such that it is sandwiched between the elbow and the cylinder when the elbow is threadably attached to fitting (230) (See FIG. 6D). The function of restrictor plate (228B) is to slow down the application of the force to the carriage and prolong the application of the force to the carriage so as not to damage any parts of the assembly with excessive acceleration.

With the above description of the launcher it is seen that a number of novel features are provided and goals achieved. The launcher will "break down" and is dimensioned for fitting within the backpackable container. The breakdown may be accomplished without the use of tools. A propellant is provided to power the aircraft off the launch rail and the controlled application of the propellant is achieved so as not to overload any component of the assembly or the aircraft. Also, the rail may fold with respect to the container and be attached thereto (See FIGS. 3A–3F) and the legs may fold in. This is designed to achieve a compact assembly. Moreover the power source, here a cartridge, is self-contained and delivery of the power to the launch carriage is modulated. The "tripod setup" of the launcher with the two legs forward and the rear portion of the rail against the ground is adjustable so as to setup with wings level and nose skyward even on an even ground, and may be used to vary the height of the front of the rail above the ground. A lanyard pull is provided to trigger the cartridge. Light weight is achieved through use of aluminum, titanium, carbon fiber, stainless steel and aluminum.

Figure 6M:
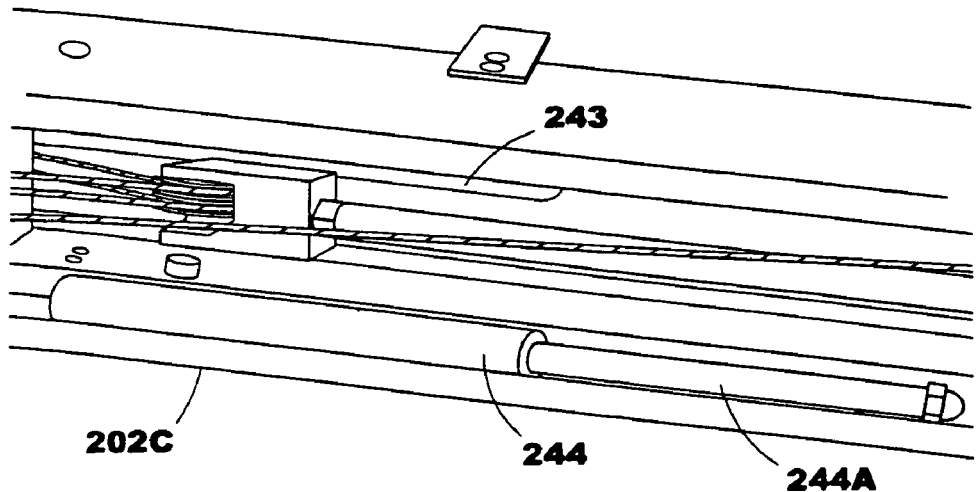
FIGS. 6M, 6N and 6O are detail perspective views of elements of Applicant's launch rail system.
Figure 6N:
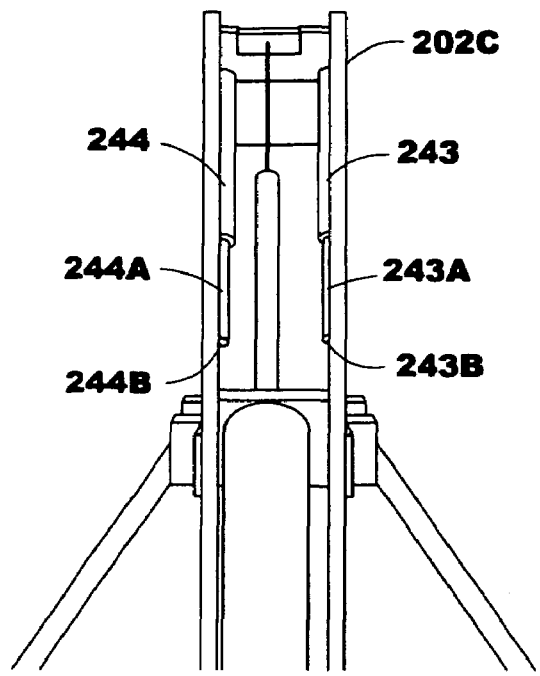
Figure 6O:
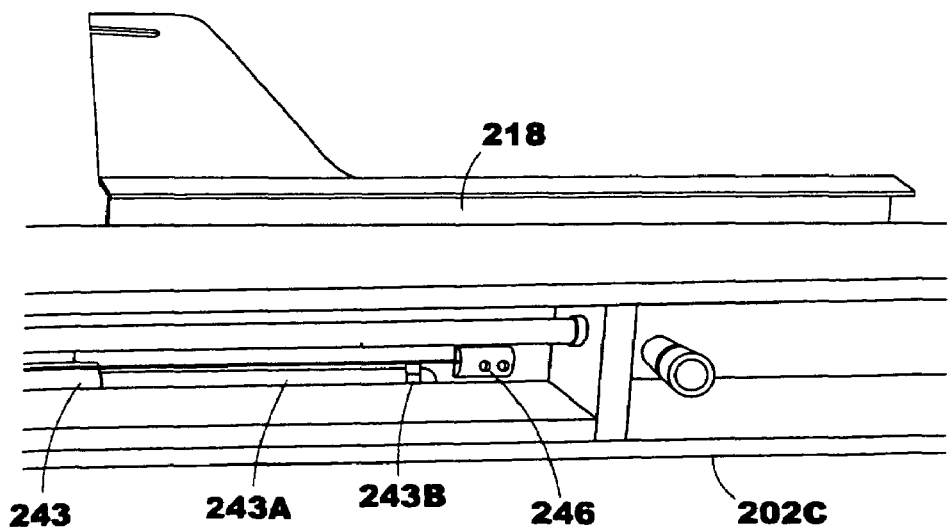

FIGS. 6M, 6N and 6O illustrate an additional feature of Applicants' launch system (200). Applicants provide means to engage the launch carriage as it approaches forward end (202C) of front section (202) so it does not slam into the endplate to cause damage to the unit. To achieve this function Applicants provide a pair of longitudinally mounted pneumatic cylinders (243) and (244) each cylinder with arms (243A) and (244A) protruding therefrom, which arms include a removed end (243B) and (244B). These removed ends of the arms and the arms themselves are in a normal extended position as set forth in FIGS. 6M, 6N and 6O. However, with respect to FIG. 6O it is seen that as the carriage approaches the front end of the rail, stubs (246) mounted on the underside of carriage base (218) will engage the removed ends of the cylinders and cause them to compress and therefore slow the carriage as it travels, under the impetus of the propellant, towards the stop at the forward end of front section (202).

Applicants launcher has achieved means of controlling acceleration and also controlling deceleration so as to control the "g" loading on the elements of the launcher, including the load on the aircraft while under acceleration and deceleration. This achieves a balance in powered delivery. The length of the rail is necessarily limited by the dimensions of the container and the requirements for "backpackability" of the unit, yet power delivery must be sufficient to provide a launch velocity to the aircraft which will exceed the stall speed of the aircraft at a given density altitude. Moreover, Applicants have achieved, through a three point attachment of the aircraft to the carriage that is slotted, the ability for the aircraft to fly off the carriage under its own power as the carriage decelerates. The carriage will be undergoing negative acceleration (slowing) over, typically, the last 6 to 12 inches due the pair of pneumatic "air shocks" attached between the rails. This deceleration combined with the slotted system (slots open forward) will allow the aircraft to move forward under its own power at a velocity sufficient to maintain flight.

Figure 7B:
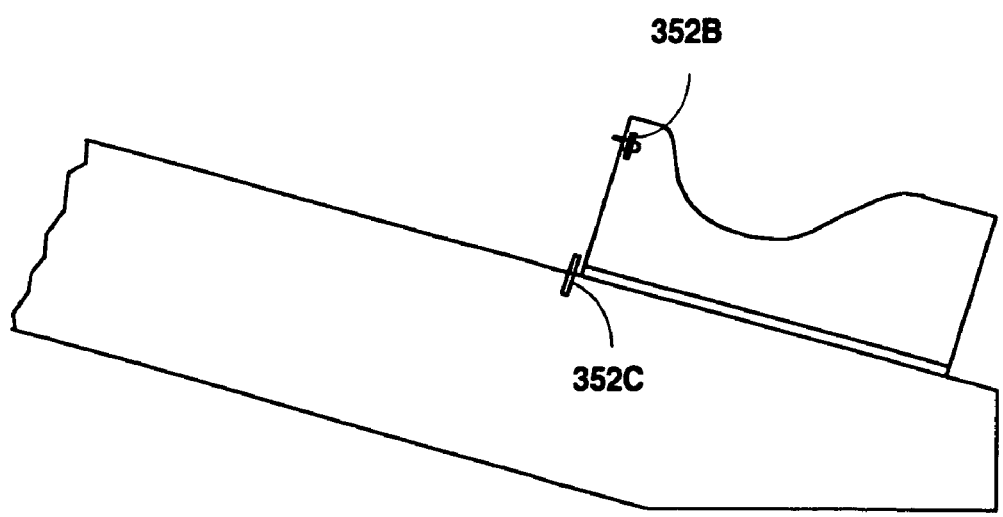
FIGS. 7B and 7M illustrate elevational views of bamboo shear pins for use with the launch carriage and airborne vehicle of Applicant's invention.

Turning now to FIG. 7B, note that when the aircraft is on the launch carriage (212), shear pins such as bamboo splints may be used, one or more (352B) to hold the plane on the carriage while the carriage is stationary and the plane is running, trying to move forward off the carriage, and the other one or more shear pins (352C) between the carriage and the rail to keep the carriage/plane combination from creeping up the rail before the launch cartridge is fired.

FIG. 5G illustrates Applicants' modular parachute recovery system here seen to include a pilot chute (361A) with shroud lines (361B) attached to a bridle which in turn joins the apex (361C) of a rip stop nylon unmodified, flat circular main canopy (361D). Suspension lines (361E) (shown here "daisy chained") depend from the skirt of the main canopy to a pair of risers (361F) and (361G) which include at the removed end thereof "D" rings (361H) for attachment to structural components within the fuselage of the aircraft.

It is seen with reference to FIG. 5G that a carbon fiber shell (361I) is shaped for receipt within the cutout at the top of the fuselage of the aircraft (See FIG. 5C) in that shell (361I) has a lip (361K) around an upper surface thereof that can engage the similarly shaped opening in the top of the fuselage such that the shell portion is inside the fuselage and the upper lip of the shell is adjacent the top surface of the fuselage. A similar lip (361L) on lid (361J) may rest against the upper surface of the fuselage or the upper lip of shell (361I) and a chute deployment servo activated arm (not shown) may overlap the lip of the lid when the aircraft is normally in flight. Preprogrammed or operator activated parachute recovery is initiated and the lid engaging arm moves out of interference with the lip (361L) of the lid. Stuffed (stowed) beneath the lid is the pilot chute. Release of the lid will allow air to get up underneath the leading edge of the lid and flip it off of the top of the fuselage, dumping the pilot chute into the airstream. The pilot chute will fill with air and deploy the main canopy, slowing the airborne vehicle in a descent to the ground.

Applicant's provide the following additional features and modifications of their novel airborne reconnaissance system. It has been noted that the rail member of the launch system may be broken down into two or more sections. Applicant's provide for a tongue and slot arrangement for detaching one rail section from the other (See FIG. 7G) along with a pin, such as a ball lock pin for insertion through the aligned holes in the tongue and slot. Applicant also provides for sections that are permanently attached to adjacent sections by hinges so that they may be folded against one another for easy storage in the box (See FIG. 7F). Further, the legs that Applicant's provide to support one end of the launcher may be either completely removable via the bracket illustrated in FIG. 6D, or may be hinged or pivoted on a bolt and permanently attached to one end of the rail but foldable so that the legs can fold against the rail for easy storage.

Applicant's describe herein a means for propelling the carriage assembly from one end of the launch rail to the other so as to propel the aircraft off the end of the launch rail at flying speed. One means for propulsion described herein includes a cartridge assembly. A second means of propulsion includes an elastic cord or cords for engaging, in a stretched position the carriage assembly at a first end of the rail and, when the carriage assembly is released, accelerating the carriage assembly as the elastic cord or cords contract, to the other end of the rail assembly to accelerate the aircraft on the carriage assembly to take off speed.

While Applicant's disclose an aircraft having a particular configuration, here a staggerwing biplane, in fact Applicant's system may utilize an aircraft of any wing or engine configuration: including, monoplane, tri-wing, canard, tractor, pusher, or any combination.

While Applicant's provide for, in the above described embodiment, a tricycle landing gear as part of the airborne vehicle, Applicant's also provide for a "tail dragger" configuration with resilient members depending from either fuselage or lower wings, the resilient depending members either having a pair of wheels attached for conventional landing or being wheelless (See 7H).

Figure 7C:
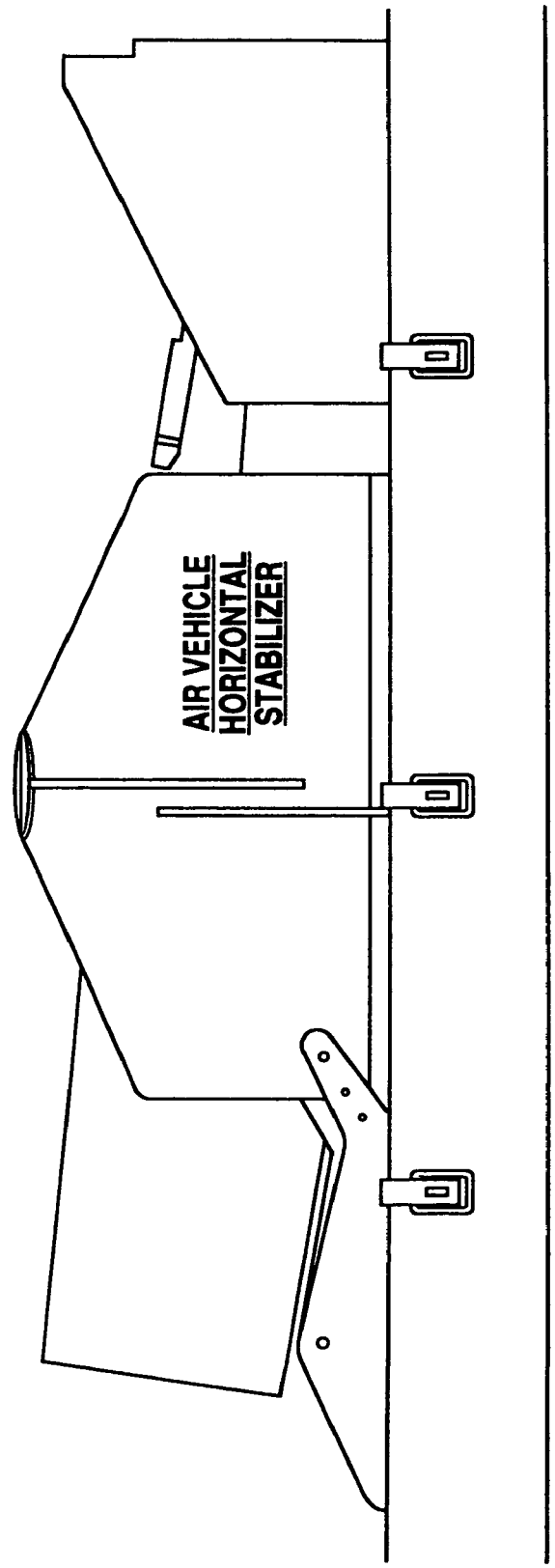
FIGS. 7C and 7D are side and end views of a container with the partially dismantled airborne vehicle and launch rail system contained therein.
Figure 7D:
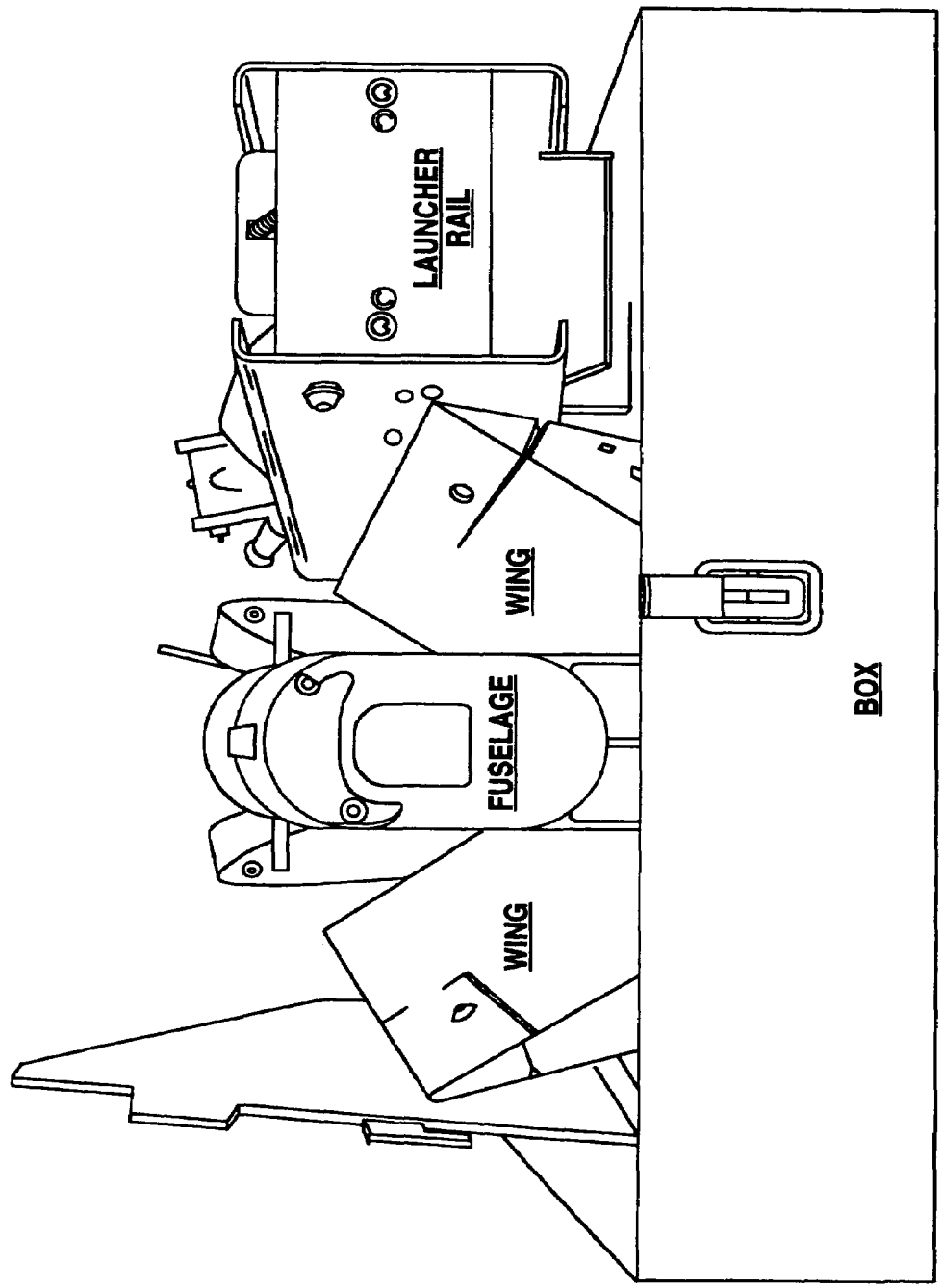
Figure 76:
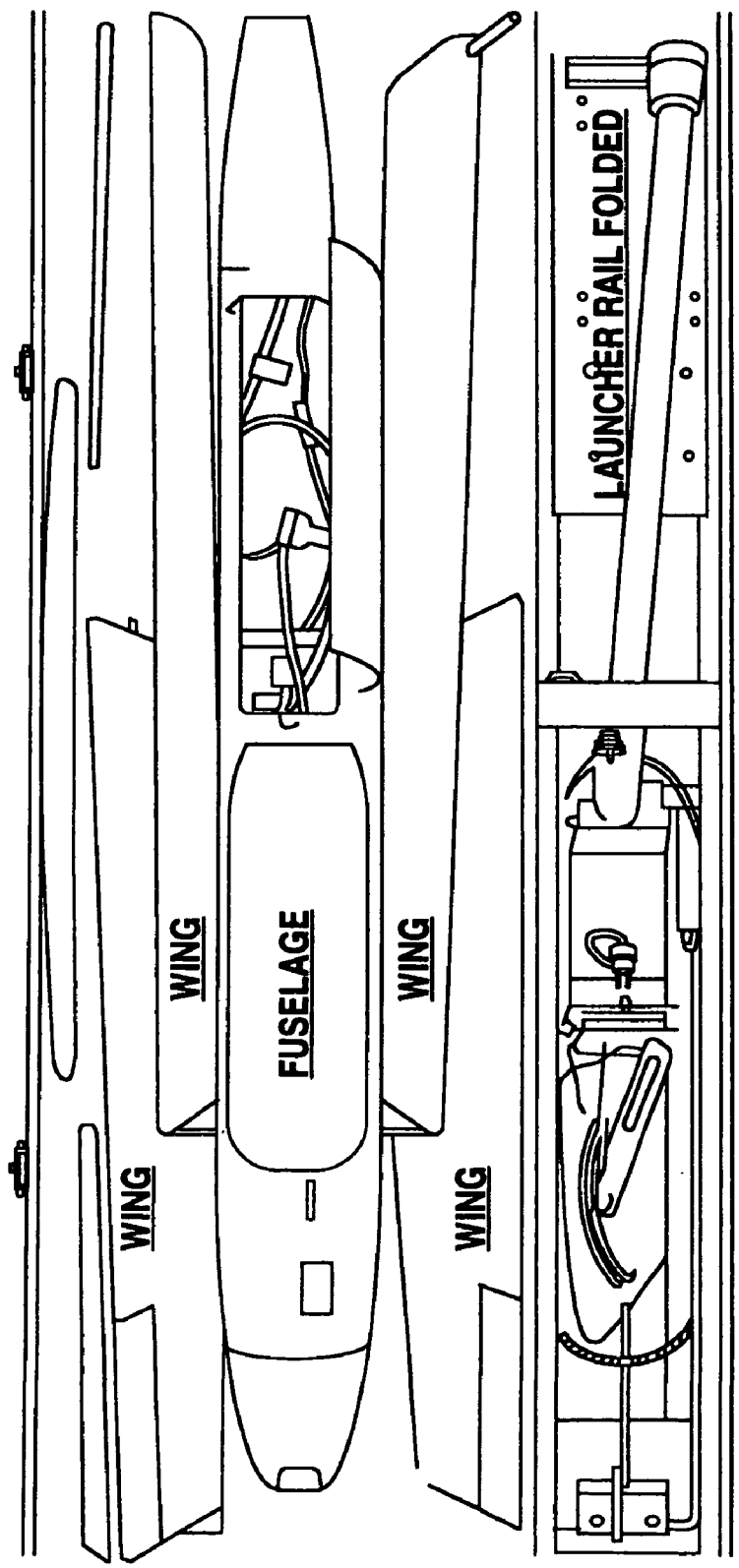
Figure 7F:
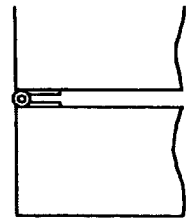
FIG. 7F is a partial side elevational view side elevational of a manner in which Applicant's launch rail system may be hinged to provide attachment of one or more sections thereof.
Figure 7G:
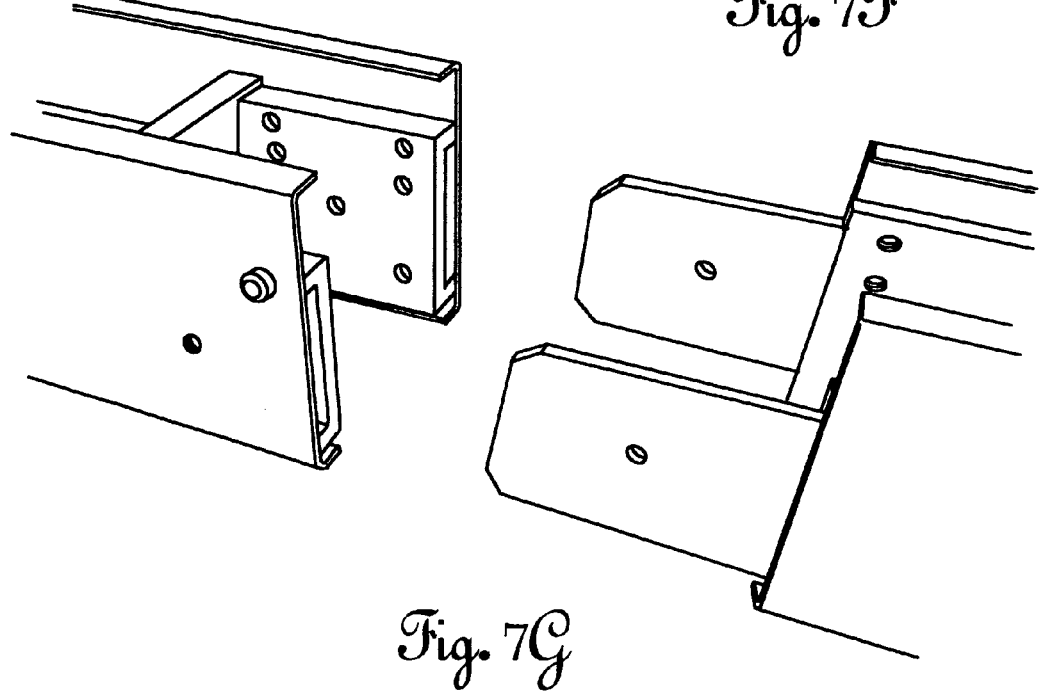
FIG. 7G is a perspective view of another manner of attaching two sections of Applicant's launch rail, here by tongues and grooves.
Figure 7H:
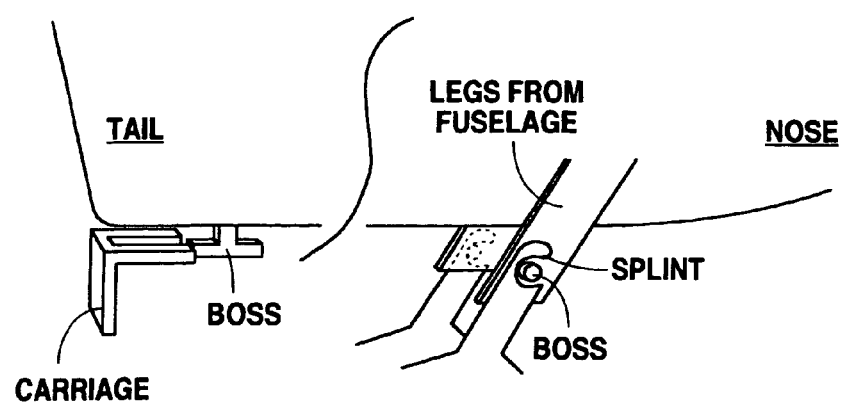
FIG. 7H illustrates in perspective view a means for engaging the carriage legs to the fuselage of an airborne vehicle.
Figure 7S:
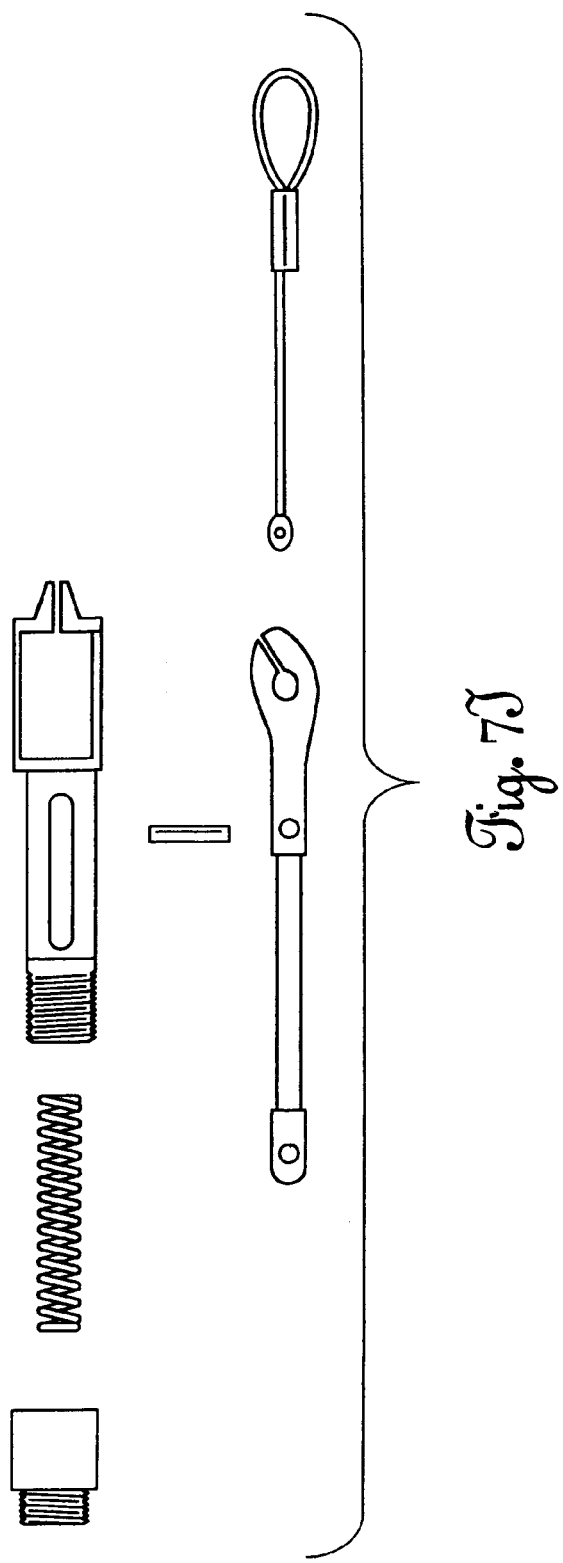
FIG. 7E illustrates in plan view a manner in which the fuselage, wing and launch rail system of Applicant's invention may be partially disassembled, for storage and transportation within a container.
FIGS. 7I, 7J, 7K and 7L all illustrate an aircraft release device for use for engaging a parachute canopy to risers attached to an aircraft so that when the aircraft, under an open canopy, strikes the ground, the parachute is released.
Figure 7T:
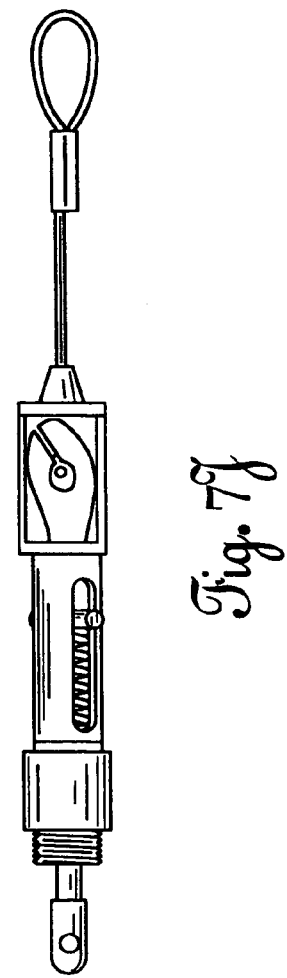

FIGS. 7H illustrates a manner in which Applicant's airborne vehicle may be launched by engagement with a carriage assembly, the carriage assembly having upwardly projecting legs to attach to legs depending downward from the fuselage and/or the lower wings and typically also by a boss extending below the fuselage at the end of the tail to engage a slot on the carriage assembly. The purpose of the downward depending legs, which typically have bosses extending therefrom and the boss extending below the fuselage near the tail is to releasably engage the carriage. Since an alternate preferred embodiment of Applicant's present invention incorporates parachute recovery, wheels will not be necessary either for take off (using instead a launch rail) or landing (parachute descent). The lack of any landing gear on the airborne vehicle saves weight. In FIG. 7H the legs depending from the fuselage are also typically used to bracket a camera that extends below the lower surface of the fuselage between the two legs. Therefore the legs illustrated in FIG. 7H serve two purposes. First, they have bosses for engagement with the carriage and second, they protect the camera and lens which typically extend below the fuselage.

Note the manner in which the carriage assembly engages the legs and the boss on the tail assembly. Basically, slots or grooves that open forward allow the carriage assembly to accelerate the aircraft and as, the carriage decelerates at the end of its travel, allow the aircraft to fly forward out of the slots and away from the launch rail. Applicant's retainer means (for example, bamboo splints) may be incorporated into appropriate holes in the legs and/or bosses extending therefrom.

Applicant's also provide, in preferred embodiment of the unmanned airborne vehicle described hereinabove, a parachute descent for the airborne vehicle. That is, Applicant's provide for an unwheeled airborne vehicle which contains only means for engaging the carriage assembly to effect take off from the rail. Landing is accomplished through parachute descent, the parachute typically stowed within the fuselage and ejected therefrom by an ejection means such as a plate and a spring backing against the plate on one end and on the fuselage on the other (See FIGS. 5G). Triggering the ejection/deployment means may be preprogrammed into the onboard computer for ejection at a given time, altitude, GPS position or emergency (engine failure, for example). The triggering of the ejection system of the parachute may also be provided by remote control operated, from a remote control station.

Thus, Applicant's provide a novel airborne recovery system for bringing an unmanned airborne vehicle back to earth, which system uses remote or preprogrammed triggering of a parachute ejection system as set forth in FIG. 5G. Applicant's also describe, in FIGS. 7I, 7J, 7K and 7L, a novel means for releasing the unmanned airborne vehicle from the parachute when the vehicle strikes the ground. This may be necessary when, for example, there is a strong wind and the vehicle is descending into rugged terrain, to avoid the vehicle being dragged, and perhaps damaged, by a windfilled parachute after the aircraft has struck the ground.

Applicant's automatic release system includes, as set forth in FIGS. 7I to 7L, an elongated hollow housing having a nose end and a removed end. The nose end is slotted and the housing is hollow, with the threaded end for receipt of a threaded retainer cap thereon. The housing also includes one or more guide pin slots. A plunger is dimensioned for receipt into the housing, the plunger having a sloped plunger head, a plunder shaft and a removed end. The plunger head is designed for sliding receipt into the interior of the housing. The plunger head contains an angled nose with a disarming pin insert in the face thereof. A hole for receipt of a guide pin therein is typically provided in the head. The head is seen to have a greater diameter then the shaft. A spring is provided for receiving onto the shaft of the plunger, the spring captured at one end by the shoulder between the head and shaft and the other end by the threaded retainer. The spring will urge the nose of the head of the plunger towards the nose of the housing (See FIG. 7J). The removed end of the plunger has a cutout for receipt of a ring or other means to engage the suspension lines of the canopy of the parachute.

An engagement arm is provided with a ball end and a loop end, the loop end for engagement with the fuselage of the aircraft. The ball end has a cutout or notch for receipt of one end of the disarming pin therein. The engagement arm is dimensioned to fit within the slot of the nose of the housing and, the ball being larger than the slot the ball, will be held against the interior of the nose by the pin when the parachute release device is "armed" as seen in FIG. 7J. A disarming pin will "arm" the device by separating from the plunger which is normally bias towards the nose of the housing. One end of the disarming pin is in the ball of the engagement arm and the other in the insert of the slanted face of the plunger, disarming the device.

Opening shock during deployment of the parachute from the aircraft will create tension in the device pulling the plunger away from the nose of the housing and allowing the disarming pin to fall out and "arm" the device. Following opening shock (and loss of the disarming pin, thus "arming" the device) the spring will cause the plunger nose to move toward the nose of the housing and kick out the disarming pin if the disarming pin has not fallen out, due to the slope on the face of the plunger. However, tension in the device due to the weight of the aircraft suspended beneath the canopy of the parachute will maintain engagement of the ball with the nose. However, the aircraft strikes the ground the parachute will continue to descent and the housing will descend with respect to the ball and the sloped nose of the plunger will kick the ball out causing disengagement between the engagement arm and the nose of the housing and separation of the parachute from the fuselage. The entire unit is typically made from machined aluminum so as to be lightweight but strong and durable.

The box or container for containing therein Applicant's broken down aircraft and launch rail is typically about 40 inches long, 16 inches wide and, 10 inches high. It typically weighs between 3 and 15 pounds and is made of one or more of following materials: fiberglass, aluminum, plastic, composite, carbon fiber, foam and metal. It is generally rectangular with lid and is substantially weatherproof and waterproof (including gaskets between the lid and the box). The walls of the box may also include an air pressure compensating valve to allow pressure relief when there is a pressure differential between the air inside the box and the air outside the box. The interior of the box may also include foam or a soft pliable material to place between and cushion elements contained therein.

The wings and/or tail of the aircraft may be detachable from the fuselage. By detachable Applicant's means they may be physically removable from the fuselage or may remain attached to the fuselage as by hinge, but may be foldable against the longitudinal axis of the fuselage. Detachment by removal may be accomplished by a rod and pin arrangement between the root of a wing section and the fuselage. Detachment by folding may be accomplished by a hinge mechanism as illustrated in FIGS. 5H and 5J. Both wing sections of the biplane may be either detached by a complete removal or both wing sections of the biplane may be detached by a hinge. As illustrated in FIG. 7D it is seen that one section may be removed and the other section hinged. Indeed, the empennage may include removal or detachment in the same manner of the horizontal stabilizer sections and/or the vertical stabilizer as seen in FIG. 7C.

Applicant's novel reconnaissance system includes a guidance system on the unmanned aircraft which includes a programmable computer means to control the flight path of the aircraft so as to reach a predetermined point removed from the launch site. The unmanned aircraft may also include a fixed or moving camera capable of receiving images beneath the flight of the unmanned aircraft. Onboard telemetry means may provide for real time signal transmission of images to a remote site, the remote site including, for example, a control station, a remote receiver and a display, for receipt and display of real time telemetry signals including images. The remote station may include a transmitter for transmitting signals to an onboard receiver which can overwrite any preprogrammed signals to the control surfaces allowing an individual at the remote site to "fly" by the remote display and the remote control system, the aircraft. Indeed, a remote operator can overwrite the preprogrammed flight to bring the aircraft back to or near the remote station and the remote operator can trigger the preprogrammed parachute for remote deployment upwind of the control station so that the aircraft via parachute deployment, can be returned to the operator even if the operator has moved between launching the aircraft and returning the aircraft.

Figure 7K:
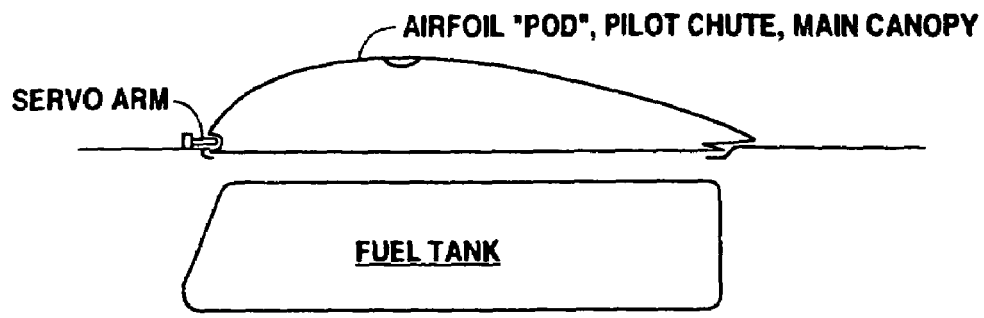
Figure 7M:
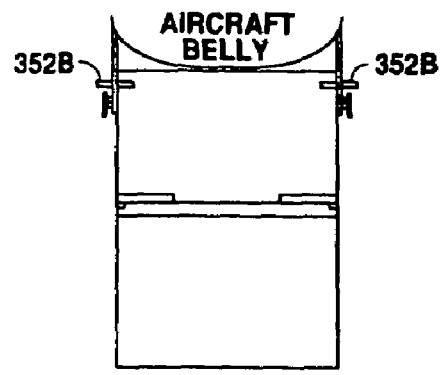
Figure 7L:
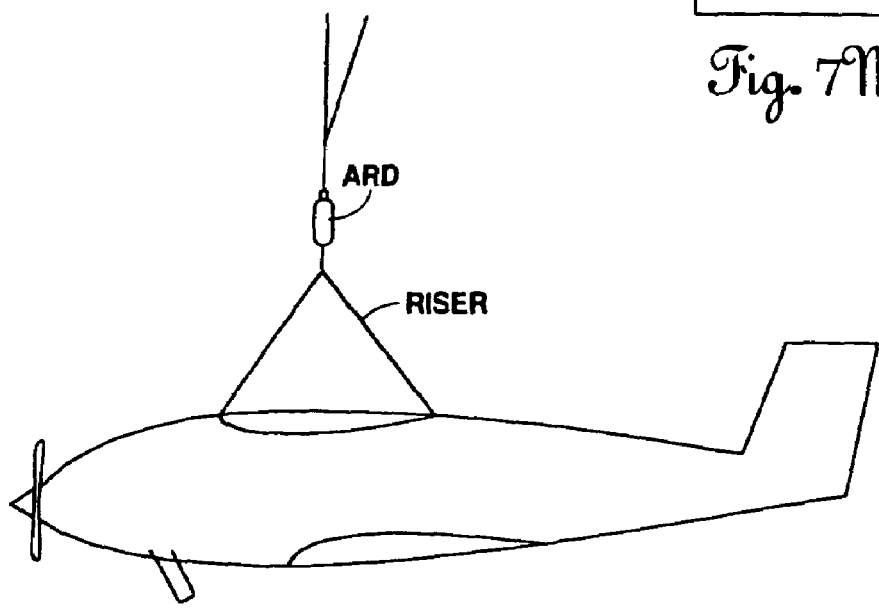

FIGS. 7J and 7K illustrate an airborne vehicle with a parachute deployed being returned to the earth via the canopy of the parachute. Notice that FIG. 7J illustrates a pair of risers connecting the parachute automatic release device "ARD" to the fuselage of the aircraft, so that the aircraft is at an attitude as illustrated. This attitude will be less damaging to the aircraft when it strikes the ground.

FIG. 7K illustrates an alternate preferred embodiment of deploying Applicant's parachute recovery assembly including the automatic release device. More specifically FIG. 7K illustrates the use of an airfoil shaped "pod" for engagement with the outer surface of the fuselage. Being an airfoil shape, the pod will lift off when a servo arm, typically activated by a preprogrammed computer, releases the pod from engagement with a cutout in the fuselage. The pod typically contains a pilot chute, the main canopy and suspension lines, a D ring, the automatic release device and risers partially or completely stowed within it. These elements are packed in the pod and placed, into the fuselage, typically over the fuel tank. The pod is engaged to the cutout in the top surface of the fuselage, with the servo arm engaging a lip at the nose of the pod. Since the pod is airfoil shaped there is air passing over to allow lift off once the server arm is disengage from the leading edge lip of the pod. Wind will catch the entire unit and begin deployment of the pilot chute, main chute, etc.

Figure 8:
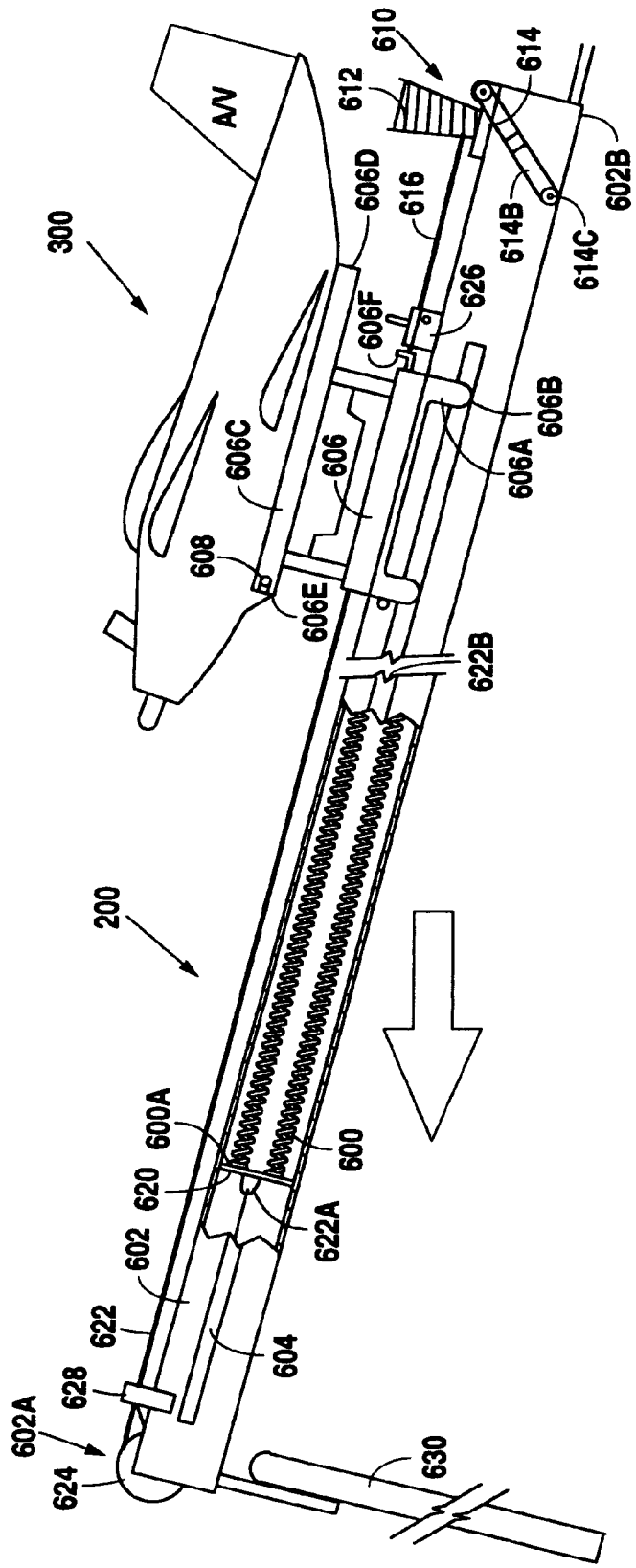
FIG. 8 illustrates in side elevational view an alternate preferred embodiment of Applicants' present invention. This includes an airborne vehicle 300 with a number of features similar to the features set forth in the embodiment above, as well as some structural features and functional attributes that are different.

FIG. 8 illustrates in side elevational view an alternate preferred embodiment of Applicants' present invention. This includes an airborne vehicle 300 with a number of features similar to the features set forth in the embodiment above, as well as some structural features and functional attributes that are different. Likewise, the launch system 200 of this alternate preferred embodiment has a number of similar features and a number of different features than those set forth previously in these specifications.

An elongated rail member 602 is provided for the support of a carriage thereon, the carriage for engaging the airborne vehicle 300. Rail member 602 includes a front end 602A and a rear end 602B, the front end typically elevated, as for example on adjustable length legs 630 foldably attached to the rail member. A power system for launching an airborne vehicle may include an elastic cord 600, the cord for example being made of surgical tubing such as that sold under the trademark K911 by Kent Elastoner Products, Inc. The elastic cord may have a first end 600A and a second end 600B. "C" channel 604 is provided on both sides of the rail member to guide a carriage 606 from one end of the rail member to the other. The carriage 606 may include a multiplicity of legs 606A, the legs, at their removed end having pivotally mounted thereto wheels 606B (see FIG. 11), the wheels adapted to fit inside the "C" channel 604. The carriage may also include a base 606C. The base 606C may include fuselage engagement and support member 606D which will engage the fuselage and help support the fuselage of the aircraft. Fuselage engagement and support member 606D may include slots 606E for engaging bosses 608. Bosses 608 are mounted on the fuselage and slots 606E open to the front of the carriage. Therefore, when the carriage accelerates the aircraft from right to left as seen in FIG. 8, the aircraft can fly off the fuselage engagement and support member 606D and become airborne. The carriage may also include a forked hook 606F or other device for engaging reel cable 616 in a manner set forth below. Therefore, structure is provided for locating the airborne vehicle in a stable non-flying position and accelerating it on the carriage structure from one end of the rail to the other where it can "fly off" the device. Note that the airborne vehicle in this embodiment does not have a landing gear and the carriage engages a fuselage directly.

A reel system 610 is provided to energize the carriage by engaging the carriage, through a cable to the elastic cord. The reel system 610 moves the carriage to the removed or rear end 602B of the rail member, a position which stretches the elastic with respect to the carriage. This loads the system for subsequent release of the carriage and acceleration of the airborne vehicle from the right end to the left end of the rail as seen in FIG. 8. The reel system provides a carriage cable 622 for engagement at a first end 622A to the rear end of the carriage and for engagement at a second end 622B to a rotatable spool 612. The reel system provides a crank handle assembly 614 which when rotated will cause the spool to rotate and take up the carriage cable 622 thereby moving the carriage from the left to right as seen in FIG. 8 until the rear end of the carriage assembly is adjacent a trigger assembly 626, which trigger assembly will releasably engage the carriage. The function of reel system 610 is to provide a mechanical advantage, here through a set of gears and a spool, to dissipate the force required in stretching the elastic cord. As in the earlier embodiment featured above, the present embodiment provides a system for propelling the airborne vehicle from one end of the launch rail to the other, typically with sufficient energy to reach the takeoff velocity for the vehicle. In an earlier embodiment, the energy was provided by chemical potential energy in an explosive charge providing a sudden expansion of gas. In the embodiment featured in FIGS. 8–14, an elastic cord 600 is provided and elastic potential energy is stored as the cord is stretched, which elastic potential energy is converted to kinetic energy when the trigger is released and the carriage borne vehicle is accelerated from one end of the launch rail to the other.

A means for providing engagement between elastic cord 600 and the carriage is disclosed herein. More specifically, a rigid elastic mount plate 616 is provided at or near the rear end of the launch rail (see FIG. 11A). Typically, the elastic cord comprises a multiplicity of elastic bands or tubular members that are mounted at one end thereof to the rigid plate. The other end of the multiplicity of elastic bands are mounted to a moveable elastic mount plate 620 which is dimensioned to fit slidably within the hollow interior of the rail member 602.

A fixed pulley 624 is provided at the first end of the rail member. Fixed pulley 624 provided for engaging carriage cable 622. As seen in FIG. 8, carriage cable 622 has a first end attached to the carriage and, extending forward from the carriage, the carriage cable will engage the fixed pulley to loop around so the carriage cable can enter the interior of the rail member and engage the moving plate. With the carriage engaged with trigger assembly 626 and elastic cord 600 stretched, release of the trigger assembly will allow the carriage to slide forward and accelerate towards the first end of the rail. Applicants provide a carriage stop block 628 to engage the carriage so the carriage does not fly off the end of the rail, the sudden stop of the carriage allowing, however, the airborne vehicle 300 to fly off the carriage as the carriage stop block assembly 628 is designed only to engage the carriage and not the airborne vehicle.

Figures 9A, 9B:
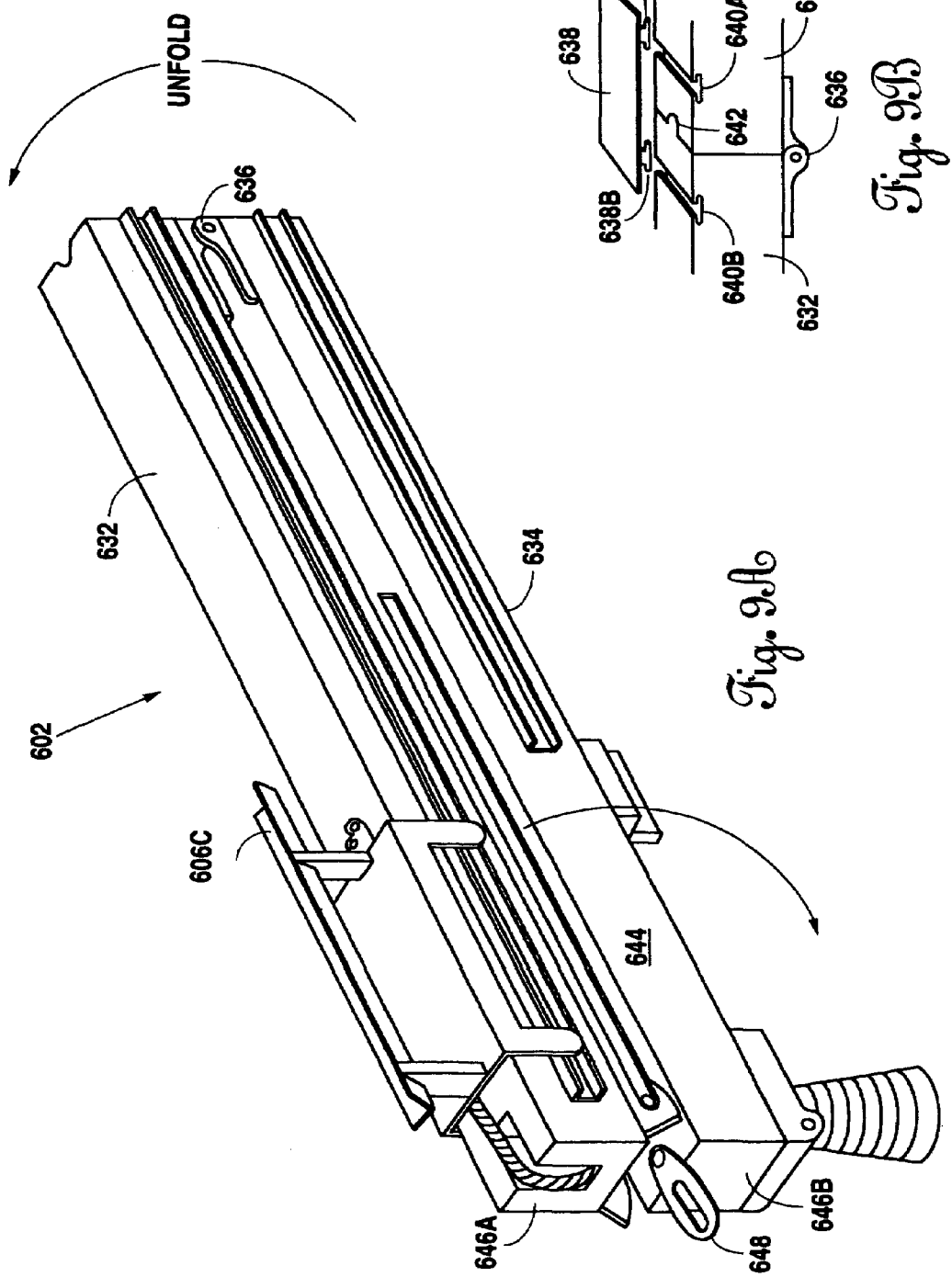
FIGS. 9A and 9B illustrate additional details of Applicants' present invention, more particularly, perspective views of the folding, hinged launch rail.

FIGS. 9A and 9B illustrate additional details of Applicants' present invention, more specifically a manner in which a first section 632 of the rail member and a second section 634, the two or three sections typically but not necessarily being equal in length, can be cooperatively engaged with a hinge 636 so that they may be able to fold adjacent one another for a more convenient travel and storage, such as travel within and storage within a container. Further details of the rail member may be appreciated with reference to FIGS. 9A and 9B showing a generally rectangular shape to the rail member, which preferably will have four sidewalls 644, and a front end wall 646A and a rear end wall 646B. A stake down ring 648 may be provided to stake down the removed end of the rail to hold it firm to a support surface such as the ground. Turning back to the geometry and design of the longitudinal rail, in a preferred embodiment, the sidewalls would be closed and the end walls, to the extent they can be while still allowing for the mounting of the fixed pulley 624, are closed to prevent dirt and other debris from entering the interior of the rail. The rail may be made from carbon fiber, titanium, aluminum, and any other suitable, light, durable, sturdy, strong material.

Turning now to details set forth in FIG. 9B, it may be appreciated that hinge 636 may allow the first and second section of the rail members to join in flush engagement. Further, one of the two sections and the other of the two sections may be configured to define an alignment tongue and groove couple 642 as illustrated to help center and guide the two sections of the rail member as they come together as illustrated in FIG. 9B. Applicants further illustrate, in FIG. 9B, a locking plate 638, the locking plate including a portion for engaging first section 632 and a portion for engaging second section 634 in such a way as to pull the two sections flush against one another with a longitudinal axis thereof in alignment such that the C channels of each section meet flush to one another. Thus, the carriage may pass over the joint between the two sections without interference. The way in which this function is achieved are in providing the locking plate 638 with tongues 638A and 638B for engaging grooves 640A and 640B, a groove in each of the two sections, and locking plate 638 for sliding on from the side of the rail. Having a low profile, avoids interference with the passage of the carriage. It is noted that while two sections of the rail member are illustrated, the rail member to be broken down into additional sections and may be pivoted or engaged as by tongue and groove or other means illustrated in these specifications.

Figure 10A:
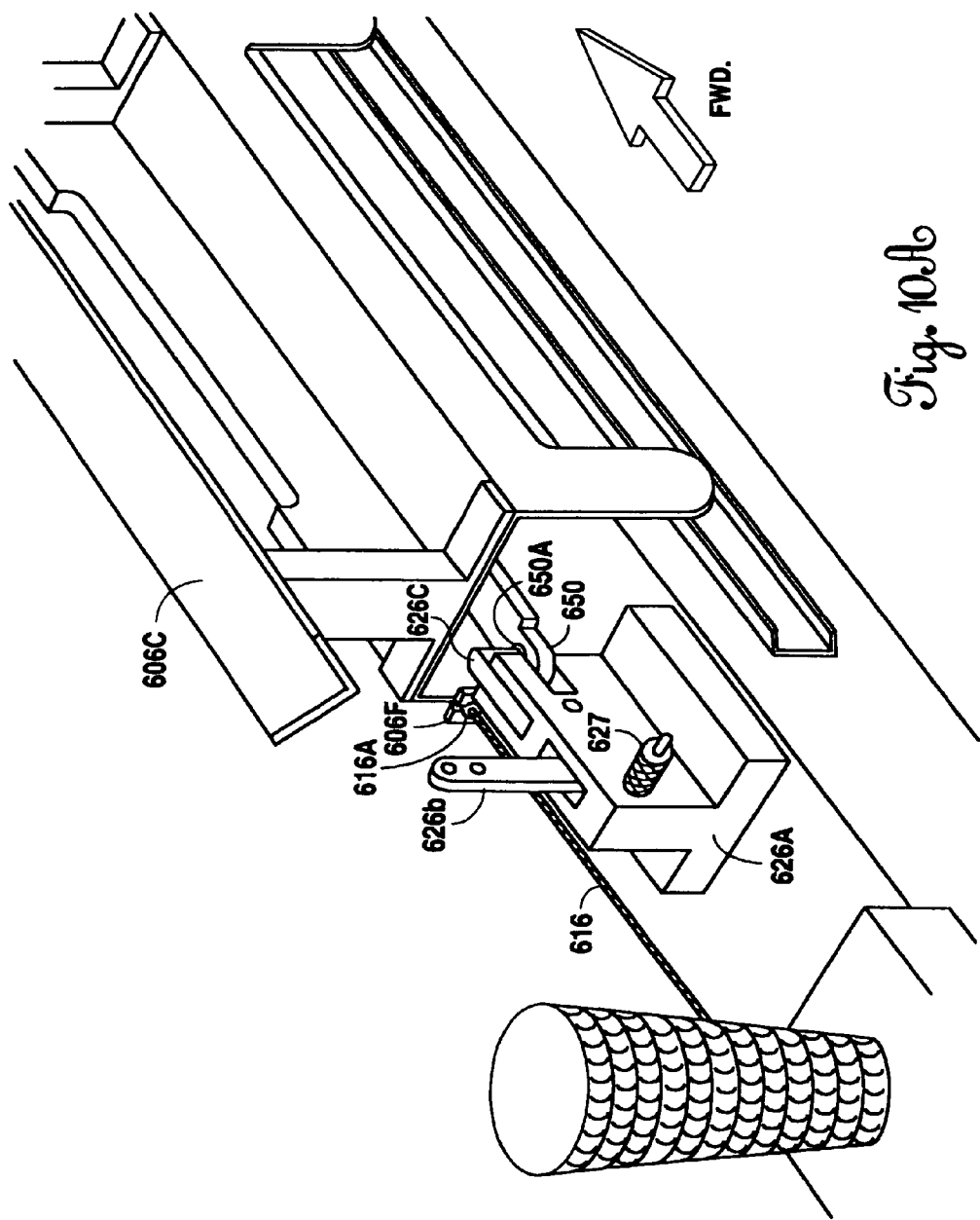
Figure 10C:
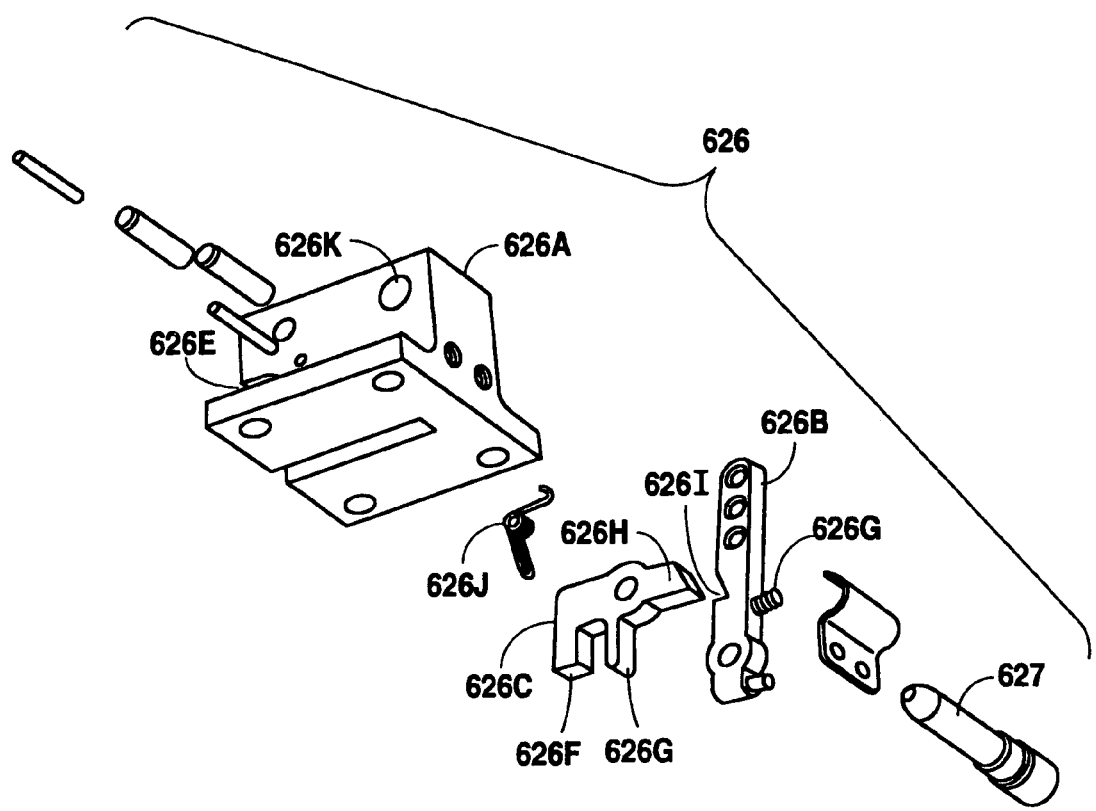

FIGS. 10A, 10B and 10C illustrate details of trigger assembly 626, the trigger assembly for engaging the carriage in a releasable manner to hold it firm while the carriage is loaded, until the trigger assembly is activated by the user, which allows the carriage assembly to fire forward. The trigger assembly is seen to include a trigger housing 626A for attachment to a sidewall or other structure of the rail member and for engaging and closing or otherwise functioning with structure set forth herein. An elongated launch trigger 626B may be provided for pivotal engagement with the housing, launch trigger also for engagement with a latch 626C. Latch 626C is seen to include latch arms 626F and 626G as well as detent arm 626H. A hole in a body of the latch allows the latch to pivotally engage the trigger housing. Turning back to launch trigger 626B, it seen to include a detent cutout 626I for engaging detent arm 626H of the latch. Springs 626J or other bias means are provided for urging the pivotally mounted latch 626C to rotate in a counterclockwise fashion as seen in FIG. 10B, which will urge the detent arm 626H down as seen in FIG. 10B. However, when the trigger assembly is in the position as illustrated in FIG. 10B and the latch arms are engaged with carriage tongue 650, namely with latch arm 626F through carriage tongue latch engagement hole 650A, the trigger assembly can hold the carriage in a loaded position. Pulling the removed end of launch trigger 626B (or a lanyard attached to the removed end) towards the rear of the launch rail as illustrated in FIG. 10B will uncouple launch trigger from detent arm 626H and the spring engaging the latch will allow the latch to uncouple with carriage tongue 650. To help prevent inadvertent releasing of the trigger, a trigger safety pin 627 is provided for engaging a safety pin hole 626K in the trigger housing which engagement will place the safety pin directly up against the rear wall of launch trigger 626B and prevent, when trigger safety pin 627 is through the safety pin whole 626K, the trigger from being pulled back (see FIG. 10A). FIG. 10B also illustrates a portion of carriage leg 606A cutaway to show the manner in which wheels 606B ride in "C" channel 604.

Figure 11B:
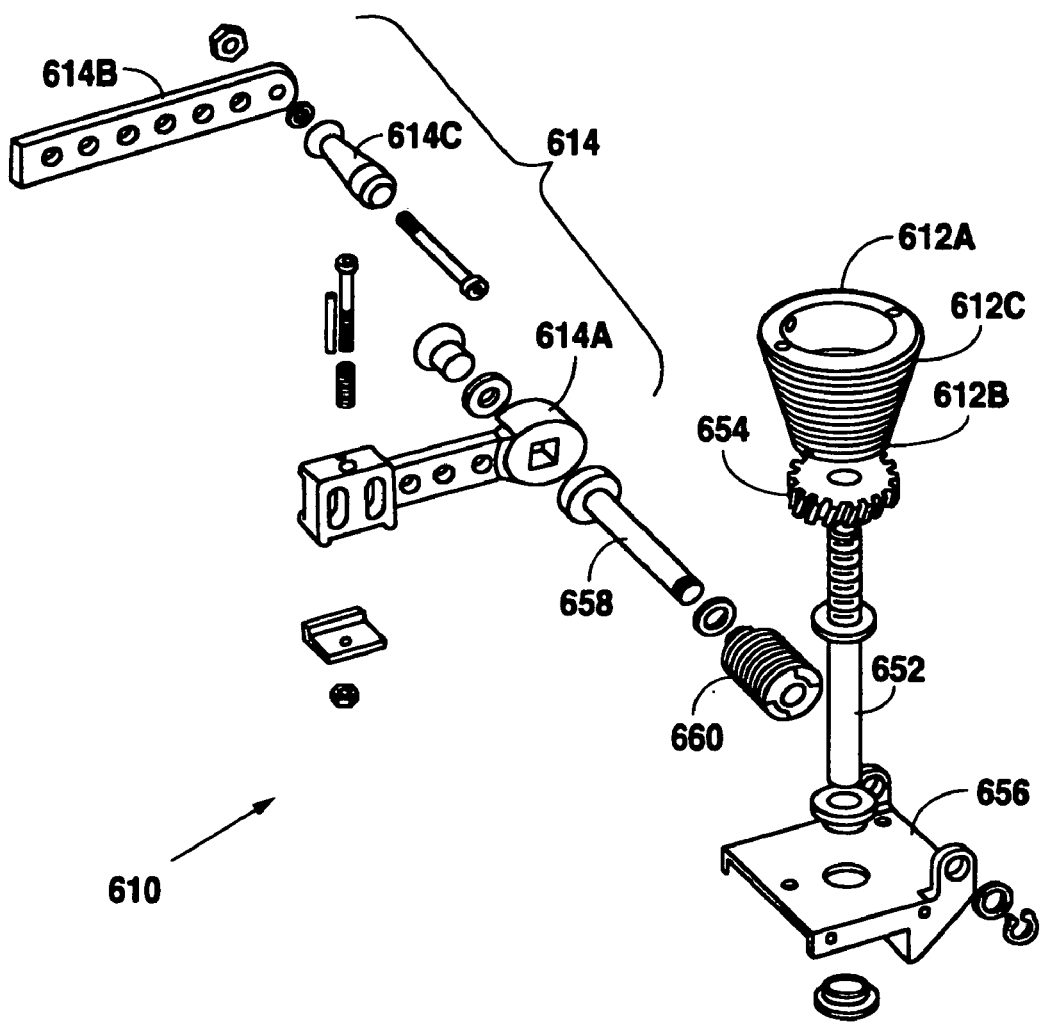

FIGS. 11A and 11B illustrate views of reel system 610, reel system 610 designed to pull the carriage from a forward position on the rail to a rearward or loaded position where the elastic cord is stretched. This loading of energy into the carriage is achieved using mechanical advantage, for example here provided by a spool 612, a crank handle assembly and related gears. The net effect of providing mechanical advantage is to decrease the force required to load the carriage against the resistance provided by the elastic cord by increasing the distance over which a force is applied. Spool 612 is seen to have a first end 612A, a second end 612B, which is smaller in diameter in a preferred embodiment, than the first end, with cable receiving groove 612C in the body of the spool between the two ends. While the spool may be cylindrical, the cone shape illustrated in this embodiment provides an advantage in that as the carriage is first retracted, cable is taken up near the first end where a complete rotation of the cylinder will wind more cable on it then when the carriage is nearing its fully loaded position and cable is winding down around the spool near second end 612B. The reason for the differential tradeoff between force and distance is that when the elastic bands are slack or when they are just beginning to stretch, not much force is necessary. However, when they reach a more extended position, additional force is required. Put another way, the amount of force required to load the elastic and move the carriage over a given distance is less as the elastic bands start to stretch compared to when they are reaching a more fully stretched position.

Spool 612 is fixedly attached to a spool shaft 652 which in turn is rotatably mounted at or near the removed end of the rail assembly by means of a mounting plate 656. Typically, spool drive gear 654 with teeth thereon is also mounted to the spool shaft such that when the spool drive gear 654 is rotated, it will move spool shaft and spool 612 in a rotary fashion. Spool drive gear 654 is caused to rotate due to meshing engagement with a worm-gear 660 which is rotatably mounted either to the housing or to the end of the rail so that it may mesh with the spool drive gear. A crank handle assembly including a mounting arm 614A, a swing arm 614B and a handle 614C is provided to engage a crank shaft 658 such that when handle 614C is rotated, worm-gear 660 rotates causing the spool to rotate. It is seen in FIG. 11B that handle 614C is mounted to the end of swing arm 614B which may be pivoted from the folded position with respect to mounting arm 614A to an aligned position with respect to the mounting arm (see FIG. 8). Allowing for pivoting alignment and extension will give the user a greater torque arm with which to apply force and wind the reel cable 616 on to the spool 612. Further detail provided with reference to FIG. 11A is the use of a carriage safety pin 662 which is an elongated member designed to be received within a hole or a slot in the sidewalls of the rail member, which hole or slot will place carriage safety pins 662 in interference with the front wall member of the carriage when the carriage is in a fully loaded position as illustrated in FIG. 11A. Additional features illustrated in FIG. 11A are mounting block 618 and a multiplicity of elastic bands comprising elastic cord 600.

Figure 12:
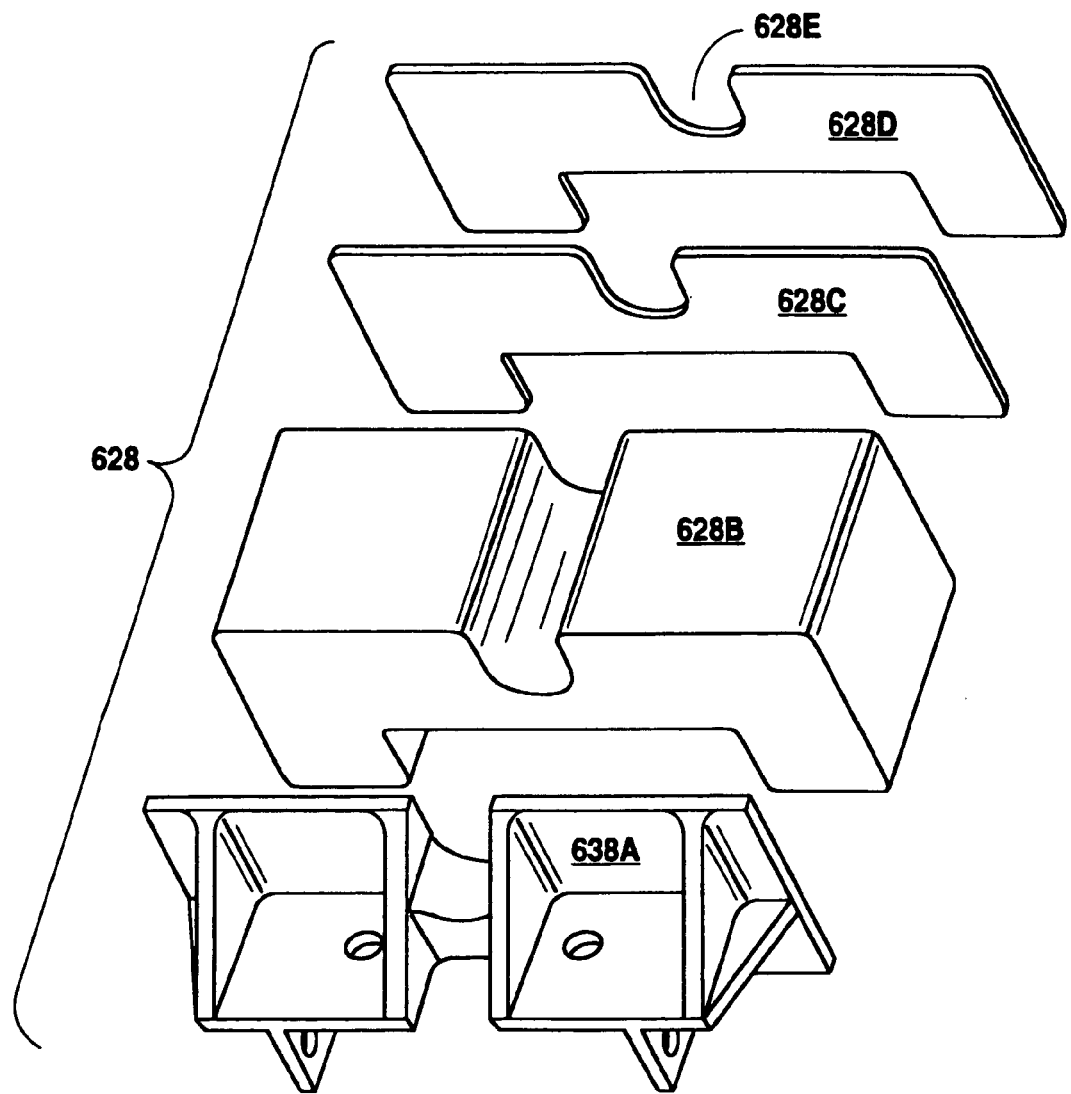
FIG. 12 is an exploded perspective view of applicants' carriage block stop assembly.

Turning now to FIG. 12, it is seen that a carriage block assembly 628 is provided to absorb the energy of the carriage as it approaches the end of the rail member. A suitable carriage block assembly has been provided, here comprising a mounting bracket 628A for mounting a foam block 628B to the carriage rail. A metal plate 628C (typically aluminum) may be provided upon which a rubber pad 628D may be applied, the metal plate and rubber pad then applied to a forward portion of the foam block. In this manner, the carriage will strike the rubber pad rather than the metal of the plate, but the plate will provide for a uniform transfer of the kinetic energy of the carriage into the foam block which will undergo elastic deformation. Since the foam block is installed at the front of the rail, a cable groove 628E is usually provided in all elements of the carriage stop block assembly 628 to avoid interference with the cable.

Figure 13:
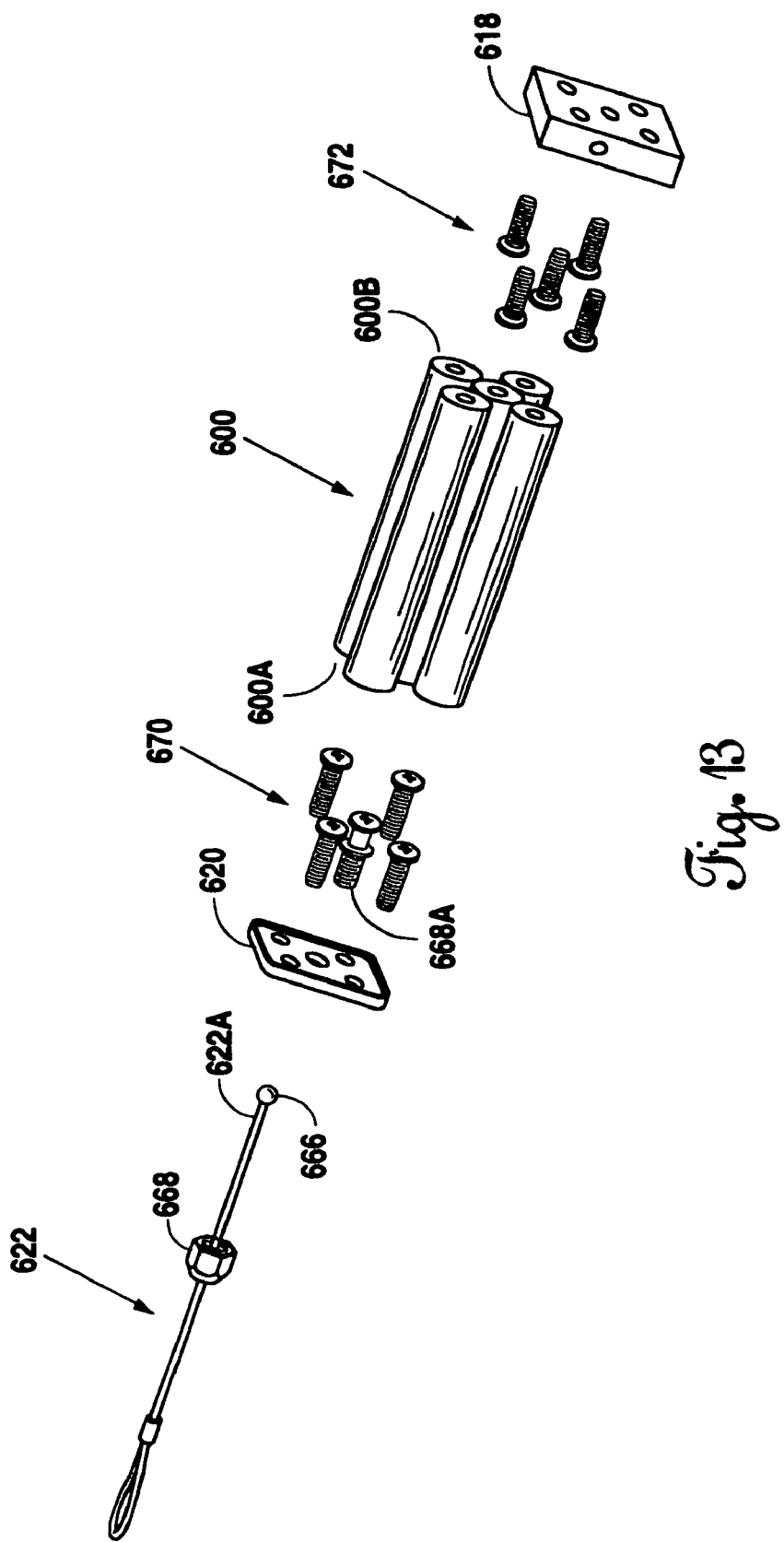
FIG. 13 illustrates an exploded perspective view of details of Applicants' elastic cord 600 are provided.

Turning now to FIG. 13, details of Applicants' elastic cord 600 are provided. It is seen that carriage cable 622 at a first end 622A may include a ball 666 and a retainer nut 668 which may engage a retainer bolt 668A, the bolt mounted to plate 620 to hold the carriage cable to the mounting plate. A first set of tubing retainer bolts 670 may be provided for engagement with a multiplicity of elastic bands and may be, indeed, molded therewith. A second set of tubing retainer bolts 672 may be provided, again molded with the removed end of individual cords, which may engage threaded fixed mounting plate 618. Thus, elastic cord may be seen to comprise one or more individual bands, for example five illustrated in FIG. 13. One end of the individual band is mounted to the fixed mounting plate, the other to the moveable mounting plate. A pattern of five (or any suitable number) may be provided for providing equal pressure to the moveable mounting plate, here the five individual bands are seen to be mounted equally distant from the center of the moveable mounting plate near the four corners of the rectangular plate and one at the center. Such uniform and symmetrical mounting would tend to hold the moveable mounting plate perpendicular to the housing. Note the head of retainer bolt 668A engages the end of the center located elastic end.

Figure 14:
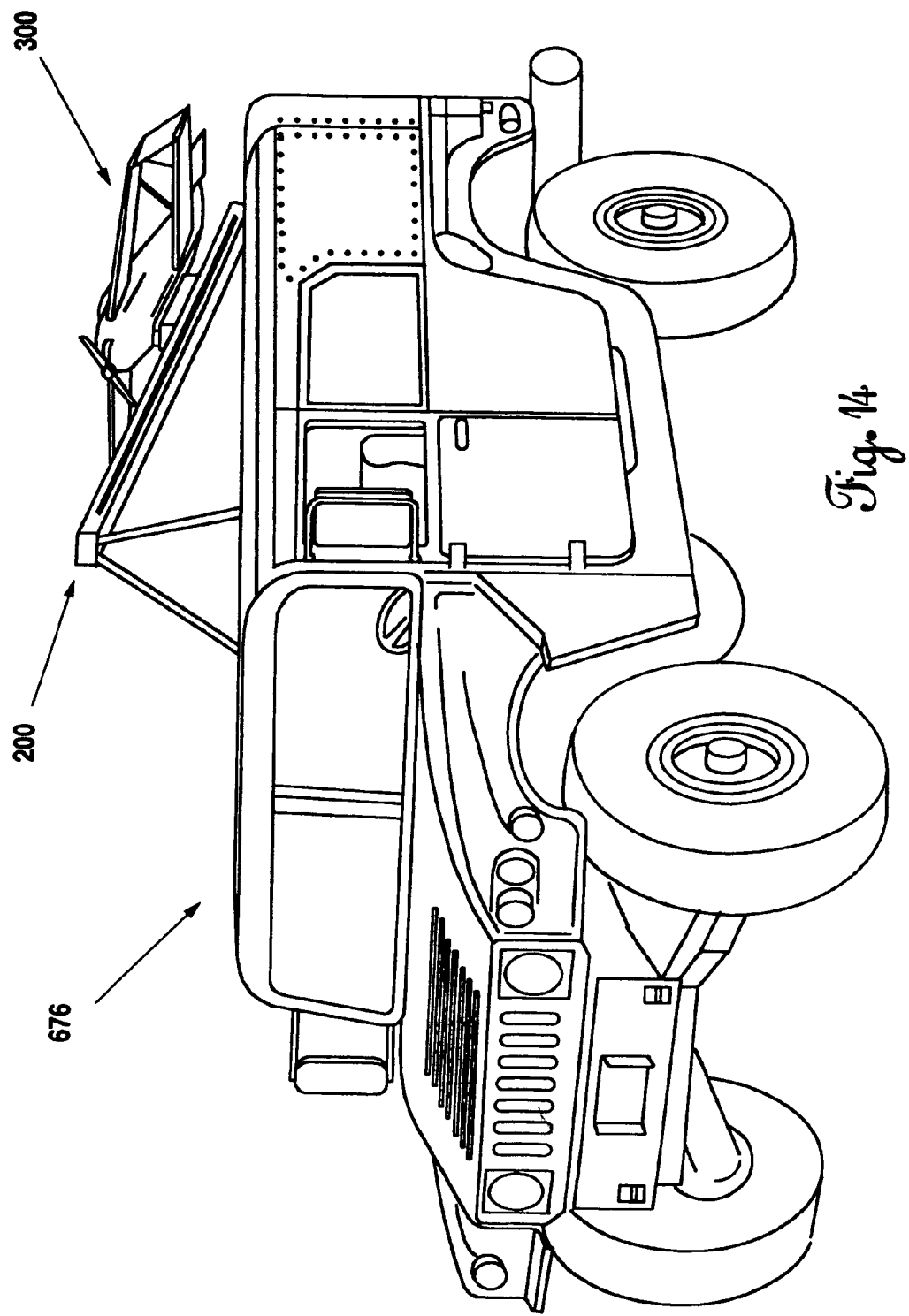
FIG. 14 illustrates Applicants' launch system 200 and airborne vehicle 300 mounted to the roof of a military vehicle 676 such as a Humvee and ready for use.

FIG. 14 illustrates Applicants' launch system 200 including a launch rail as disclosed herein and airborne vehicle 300 mounted to the roof of a military vehicle 676 such as a Humvee and ready for use. The launch rail may be permanently or removeably attached to the roof or any other suitable support surface on the military vehicle.

Although the invention has been described with reference to specific embodiments, this description is not meant to be construed in a limited sense. Various modifications and/or enhancements of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An airborne reconnaissance system comprising:

an airborne vehicle having a fuselage and wings defining a biplane, the wings adapted to be removed from the fuselage, the airborne vehicle including an onboard video camera and video signal transmitter and a flight control system to remotely control a flight of the airborne vehicle from a remote location;

a launch system including a launch rail having a longitudinal axis comprised of at least two sections;

power means;

a carriage for slidable receipt onto the launch rail member for engagement with the airborne vehicle and for engagement to the power means to power the carriage along the rail; and a container adapted to receive thereinto the airborne vehicle with the wings removed from the fuselage and the launch rail thereof.

2. An airborne reconnaissance system comprising:

an airborne vehicle having a fuselage and wings defining a biplane, the wings adapted to be removed from the fuselage, the airborne vehicle including an onboard video camera and video signal transmitter and a flight control system to remotely control a flight of the airborne vehicle from a remote location;

a launch system, including a launch rail having a longitudinal axis and comprised of at least two separate but engageable sections;

a carriage for slideable receipt onto the launch rail for engagement to the airborne vehicle;

means to power the carriage along the launch rail member; and a backpack adapted to receive the airborne vehicle with the wings removed from the fuselage and, the at least two launch rail sections.

* * * * *